US012682434B2

(12) United States Patent
Imaizumi et al.

(10) Patent No.: US 12,682,434 B2
(45) Date of Patent: Jul. 14, 2026

(54) IMAGE PROCESSING APPARATUS AND IMAGE PROCESSING METHOD

(71) Applicant: SHARP KABUSHIKI KAISHA, Sakai City (JP)

(72) Inventors: Daisaku Imaizumi, Sakai City (JP); Teruhiko Matsuoka, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 373 days.

(21) Appl. No.: 18/225,245

(22) Filed: Jul. 24, 2023

(65) Prior Publication Data

US 2024/0037716 A1 Feb. 1, 2024

(30) Foreign Application Priority Data

Jul. 29, 2022 (JP) ................................. 2022-121818

(51) Int. Cl.
*G06T 5/73* (2024.01)
*G06V 10/28* (2022.01)
*G06V 10/56* (2022.01)
*G06V 10/75* (2022.01)

(52) U.S. Cl.
CPC ............... *G06T 5/73* (2024.01); *G06V 10/28* (2022.01); *G06V 10/56* (2022.01); *G06V 10/751* (2022.01); *G06V 10/758* (2022.01)

(58) Field of Classification Search
CPC ........ G06T 5/73; G06V 10/56; G06V 10/751; G06V 10/758; G06V 10/28
See application file for complete search history.

(56) References Cited

U.S. PATENT DOCUMENTS

2006/0119897 A1* 6/2006 Morikawa ................. G06T 5/70
358/3.27
2012/0134581 A1 5/2012 Matsuda

FOREIGN PATENT DOCUMENTS

| CN | 102480581 A | | 5/2012 |
|---|---|---|---|
| JP | 2000125134 A | * | 4/2000 |
| JP | 2010-004128 A | | 1/2010 |
| JP | 2012-114744 A | | 6/2012 |
| JP | 4968192 B2 | * | 7/2012 |
| JP | 2020061710 A | * | 4/2020 |

* cited by examiner

*Primary Examiner* — Gregory A Morse
*Assistant Examiner* — Rohan Tejas Mukundhan
(74) *Attorney, Agent, or Firm* — ScienBiziP, P.C.

(57) ABSTRACT

An image inputter and a controller are provided, and the controller acquires a multiple-value image via the image inputter, acquires a first image obtained by performing a correction process and a simple binarization process on the multiple-value image and a second image obtained by performing the correction process on the multiple-value image, uses a difference value of a pixel value of the second image with respect to the first image on a pixel-by-pixel basis to determine whether a jaggy occurs when the multiple-value image is output as a simple binary image, when a jaggy occurs, determines a conversion method for converting the multiple-value image in accordance with an amount of statistics calculated using the difference value, and outputs an image obtained by conversion using the determined conversion method.

14 Claims, 19 Drawing Sheets

Figure 2:
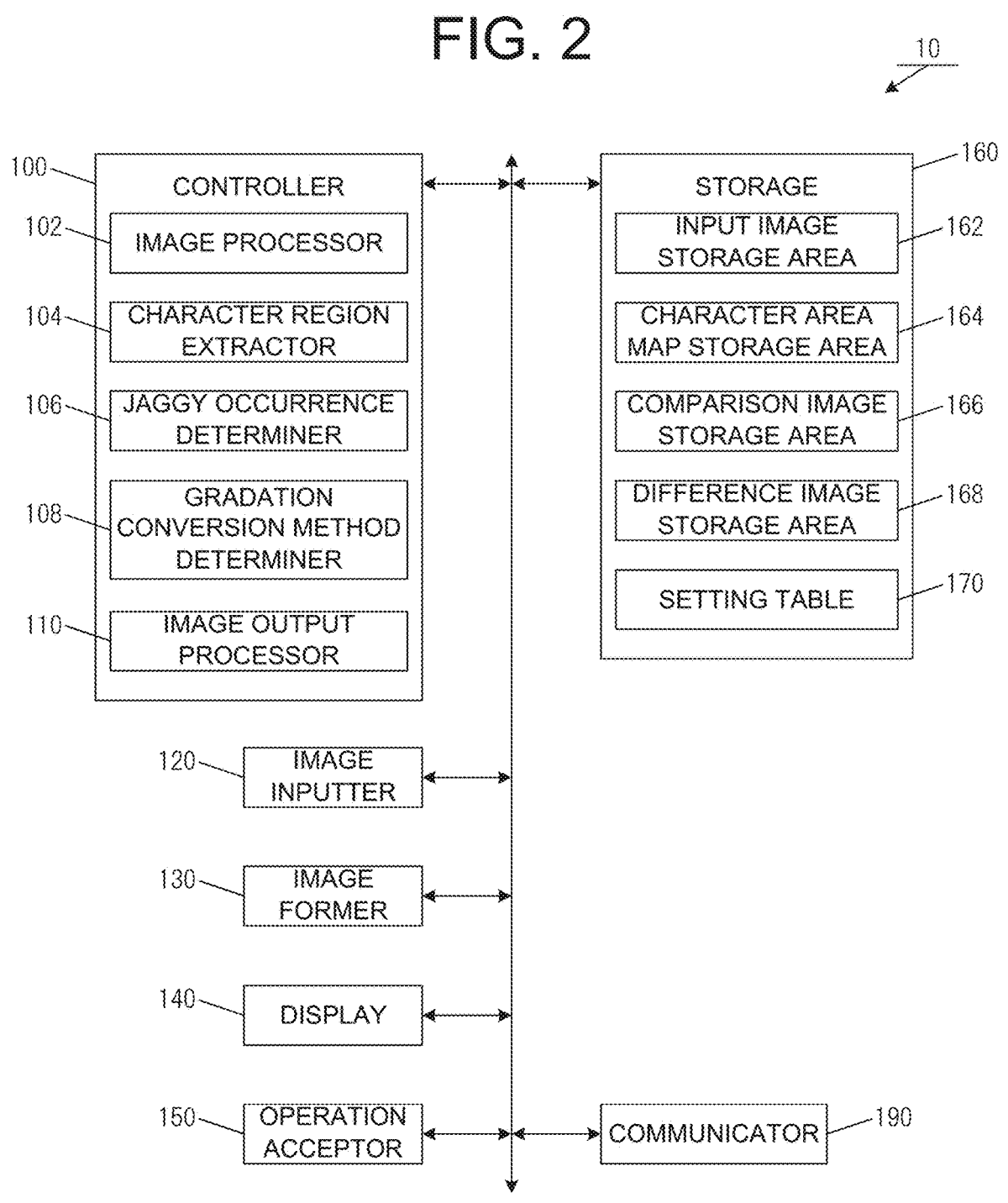

| CONTROLLER | 100 |
|---|---|
| IMAGE PROCESSOR | 102 |
| CHARACTER REGION EXTRACTOR | 104 |
| JAGGY OCCURRENCE DETERMINER | 106 |
| GRADATION CONVERSION METHOD DETERMINER | 108 |
| IMAGE OUTPUT PROCESSOR | 110 |

| STORAGE | 160 |
|---|---|
| INPUT IMAGE STORAGE AREA | 162 |
| CHARACTER AREA MAP STORAGE AREA | 164 |
| COMPARISON IMAGE STORAGE AREA | 166 |
| DIFFERENCE IMAGE STORAGE AREA | 168 |
| SETTING TABLE | 170 |

120 — IMAGE INPUTTER

130 — IMAGE FORMER

140 — DISPLAY

150 — OPERATION ACCEPTOR

COMMUNICATOR — 190

FIG. 3

| SETTING ITEM NAME | | SETTING VALUE | |
|---|---|---|---|
| PIXEL VALUE THRESHOLD (FIRST THRESHOLD) | | 64 | D100 |
| CANDIDATE PIXEL NUMBER THRESHOLD (SECOND THRESHOLD) | | 16 | D102 |
| BLOCK NUMBER THRESHOLD (THIRD THRESHOLD) | | 100 | D104 |
| RANGE (DEGREE OF JAGGIES) | SMALL | LESS THAN 1 | D106 |
| | MEDIUM | 1 OR MORE AND LESS THAN 3 | |
| | LARGE | 3 OR MORE | |
| CONDITION FOR DETERMINING GRAY SMALL-NUMBER COLOR METHOD | | – | D108 |
| CONDITION FOR DETERMINING ERROR DIFFUSION METHOD | | PERCENTAGE OF BLOCKS IN LARGE AND MEDIUM RANGES IS 50% OR MORE | D110 |
| CONDITION FOR DETERMINING GRAYSCALE METHOD | | PERCENTAGE OF BLOCKS IN LARGE RANGE IS 50% OR MORE | D112 |
| ⋮ | | ⋮ | |

FIG. 12

| SETTING ITEM NAME | | SETTING VALUE |
|---|---|---|
| PIXEL VALUE THRESHOLD (FIRST THRESHOLD) | | 64 |
| CANDIDATE PIXEL NUMBER THRESHOLD (SECOND THRESHOLD) | | 16 |
| BLOCK NUMBER THRESHOLD (THIRD THRESHOLD) | | 100 |
| RANGE (DEGREE OF JAGGIES) | SMALL | LESS THAN 1 |
| | MEDIUM | 1 OR MORE AND LESS THAN 3 |
| | LARGE | 3 OR MORE |
| OUTPUT MODE | | FILE SIZE PRIORITY |
| FILE SIZE PRIORITY | CONDITION FOR DETERMINING GRAY SMALL-NUMBER COLOR METHOD | — |
| | CONDITION FOR DETERMINING ERROR DIFFUSION METHOD | PERCENTAGE OF BLOCKS IN LARGE AND MEDIUM RANGES IS 50% OR MORE |
| | CONDITION FOR DETERMINING GRAYSCALE METHOD | PERCENTAGE OF BLOCKS IN LARGE RANGE IS 50% OR MORE |
| IMAGE QUALITY PRIORITY | CONDITION FOR DETERMINING GRAY SMALL-NUMBER COLOR METHOD | PERCENTAGE OF BLOCKS IN SMALL AND MEDIUM RANGES IS 75% OR MORE |
| | CONDITION FOR DETERMINING ERROR DIFFUSION METHOD | PERCENTAGE OF BLOCKS IN SMALL AND MEDIUM RANGES IS 50% OR MORE |
| | CONDITION FOR DETERMINING GRAYSCALE METHOD | — |
| ⋮ | | ⋮ |

| SETTING ITEM NAME | | SETTING VALUE |
|---|---|---|
| PIXEL VALUE THRESHOLD (FIRST THRESHOLD) | | 64 |
| CANDIDATE PIXEL NUMBER THRESHOLD (SECOND THRESHOLD) | | 16 |
| BLOCK NUMBER THRESHOLD (THIRD THRESHOLD) | HIGH | 30 |
| | SLIGHTLY HIGH | 50 |
| | STANDARD | 100 |
| | SLIGHTLY LOW | 200 |
| | LOW | 400 |
| JAGGY DETECTION LEVEL | | STANDARD |
| RANGE (DEGREE OF JAGGIES) | SMALL | LESS THAN 1 |
| | MEDIUM | 1 OR MORE AND LESS THAN 3 |
| | LARGE | 3 OR MORE |
| CONDITION FOR DETERMINING GRAY SMALL-NUMBER COLOR METHOD | | – |
| CONDITION FOR DETERMINING ERROR DIFFUSION METHOD | | PERCENTAGE OF BLOCKS IN LARGE AND MEDIUM RANGES IS 50% OR MORE |
| CONDITION FOR DETERMINING GRAYSCALE METHOD | | PERCENTAGE OF BLOCKS IN LARGE RANGE IS 50% OR MORE |
| ⋮ | | ⋮ |

| SETTING ITEM NAME | | SETTING VALUE |
|---|---|---|
| PIXEL VALUE THRESHOLD (FIRST THRESHOLD) | | 64 |
| CANDIDATE PIXEL NUMBER THRESHOLD (SECOND THRESHOLD) | | 16 |
| BLOCK NUMBER THRESHOLD (THIRD THRESHOLD) | | 100 |
| RANGE (DEGREE OF JAGGIES) | SMALL | LESS THAN 1 |
| | MEDIUM | 1 OR MORE AND LESS THAN 3 |
| | LARGE | 3 OR MORE |
| METHOD FOR DETERMINING GRADATION CONVERSION METHOD | | USER DESIGNATED |
| GRADATION CONVERSION METHOD DESIGNATED BY USER | | GRAY SMALL-NUMBER COLOR |
| CONDITION FOR DETERMINING GRAY SMALL-NUMBER COLOR METHOD | | ... |
| CONDITION FOR DETERMINING ERROR DIFFUSION METHOD | | PERCENTAGE OF BLOCKS IN LARGE AND MEDIUM RANGES IS 50% OR MORE |
| CONDITION FOR DETERMINING GRAYSCALE METHOD | | PERCENTAGE OF BLOCKS IN LARGE RANGE IS 50% OR MORE |
| ⋮ | | ⋮ |

Figure 18:
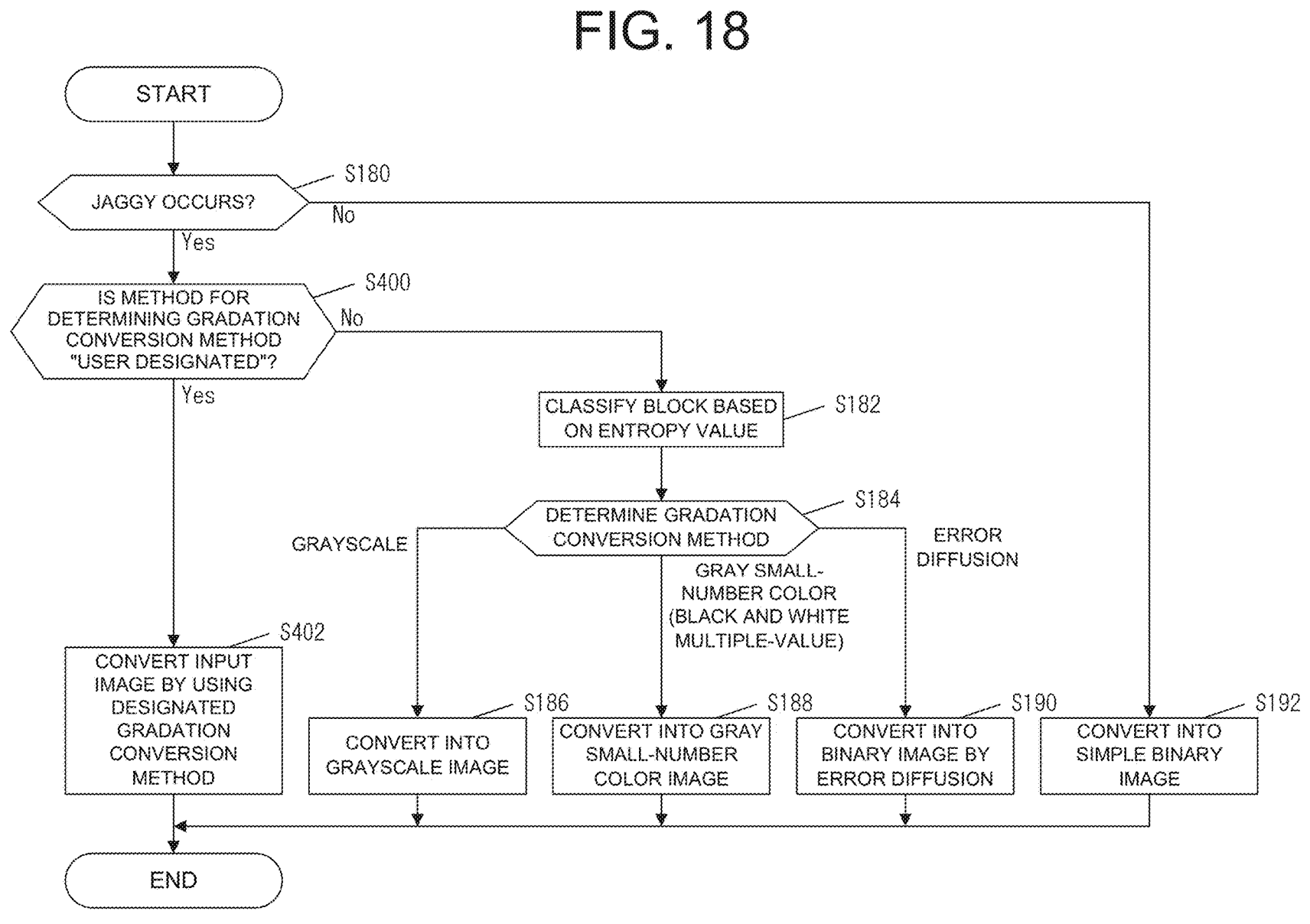

START

S180 JAGGY OCCURS? — No

Yes

S400 IS METHOD FOR DETERMINING GRADATION CONVERSION METHOD "USER DESIGNATED"? — No

Yes

S182 CLASSIFY BLOCK BASED ON ENTROPY VALUE

S184 DETERMINE GRADATION CONVERSION METHOD

GRAYSCALE

GRAY SMALL-NUMBER COLOR (BLACK AND WHITE MULTIPLE-VALUE)

ERROR DIFFUSION

S186 CONVERT INTO GRAYSCALE IMAGE

S188 CONVERT INTO GRAY SMALL-NUMBER COLOR IMAGE

S190 CONVERT INTO BINARY IMAGE BY ERROR DIFFUSION

S192 CONVERT INTO SIMPLE BINARY IMAGE

S402 CONVERT INPUT IMAGE BY USING DESIGNATED GRADATION CONVERSION METHOD

END

IMAGE PROCESSING APPARATUS AND IMAGE PROCESSING METHOD

INCORPORATION BY REFERENCE

This application is based upon and claims the benefit of priority from the corresponding Japanese Patent Application No. 2022-121818 filed on Jul. 29, 2022, the entire contents of which are incorporated herein by reference.

BACKGROUND OF THE INVENTION

Field of the Invention

The present disclosure relates to an image processing apparatus, and the like.

Description of the Background Art

For image processing apparatuses such as multifunction peripherals, there is a conventionally used technology to reduce step-like aliasing (jaggies) appearing in lines and outlines of output images when a facsimile machine or printer outputs images.

There is a conventionally known technology in which, when a facsimile machine or printer outputs an image, pattern matching is used to detect jaggies generated due to an enlargement process using a simple technique from the image and a smoothing process is performed on characters and line drawings. Furthermore, there is a known technology in which a plurality of binarized image data is generated by a plurality of binarization references and is compared with each other to detect jaggies, and areas for strong and weak smoothing processes are extracted in accordance with the type of binarized image used for comparison so that smoothing is performed.

In conventional technologies including the above-described technologies, to detect jaggies, it is determined whether the shape is the one that is supposed to be based on the degree of matching of the image with the surrounding pixels including the pixel of interest, and it is necessary to compare each individual pixel with the surrounding pixels. Therefore, there are issues in implementation, such as the enormous amount of processing and an increase in the required storage capacity such that it is necessary to devise ways to reduce the number of patterns to be stored. The use of a plurality of comparison images or different smoothing performed for different parts of the image also had similar issues in implementation.

In view of the above-described issues, the purpose of the present disclosure is to provide an image processing apparatus, and the like, which determines whether a jaggy occurs by using a simple method and outputs images using an appropriate method.

SUMMARY OF THE INVENTION

An image processing apparatus according to the present disclosure includes an image inputter and a controller, and the controller acquires a multiple-value image via the image inputter, acquires a first image obtained by performing a correction process and a simple binarization process on the multiple-value image and a second image obtained by performing the correction process on the multiple-value image, uses a difference value of a pixel value of the second image with respect to the first image on a pixel-by-pixel basis to determine whether a jaggy occurs when the multiple-value image is output as a simple binary image, when a jaggy occurs, determines a conversion method for converting the multiple-value image in accordance with a statistical amount calculated using the difference value, and outputs an image obtained by conversion using the determined conversion method.

An image processing method according to the present disclosure includes acquiring a first image obtained by performing a correction process and a simple binarization process on a multiple-value image and a second image obtained by performing the correction process on the multiple-value image and using a difference value of a pixel value of the second image with respect to the first image on a pixel-by-pixel basis to determine whether a jaggy occurs when the multiple-value image is output as a simple binary image, when a jaggy occurs, determining a conversion method for converting the multiple-value image in accordance with a statistical amount calculated using the difference value, and outputting an image obtained by conversion using the determined conversion method.

According to the present disclosure, it is possible to provide an image processing apparatus, and the like, which determines whether a jaggy occurs by using a simple method and outputs images using an appropriate method.

BRIEF DESCRIPTION OF THE DRAWINGS

FIG. 2 is a functional configuration diagram of the multifunction peripheral according to the first embodiment.

FIG. 3 is a table illustrating an example of a data structure of a setting table according to the first embodiment.

FIG. 12 is a table illustrating an example of a data structure of the setting table according to a second embodiment.

FIG. 14 is a table illustrating an example of a data structure of the setting table according to a third embodiment.

FIG. 17 is a table illustrating an example of a data structure of the setting table according to a fourth embodiment.

FIG. 18 is a flowchart of a gradation conversion process according to the fourth embodiment.

DESCRIPTION OF THE PREFERRED EMBODIMENTS

An embodiment for carrying out the present disclosure will be described below with reference to drawings. The embodiment below is an example for describing the present disclosure, and the technical scope of the present disclosure set forth in the scope of claims is not limited to the description below.

1. First Embodiment

A first embodiment is an embodiment in a case where an image processing apparatus according to the present disclosure is applied to a multifunction peripheral 10. The multifunction peripheral 10 is an image processing apparatus having a copy function, scan function, print function, fax function, and the like, and is also referred to as a multifunction printer/peripheral (MFP).

1.1 Functional Configuration

Figure 1:
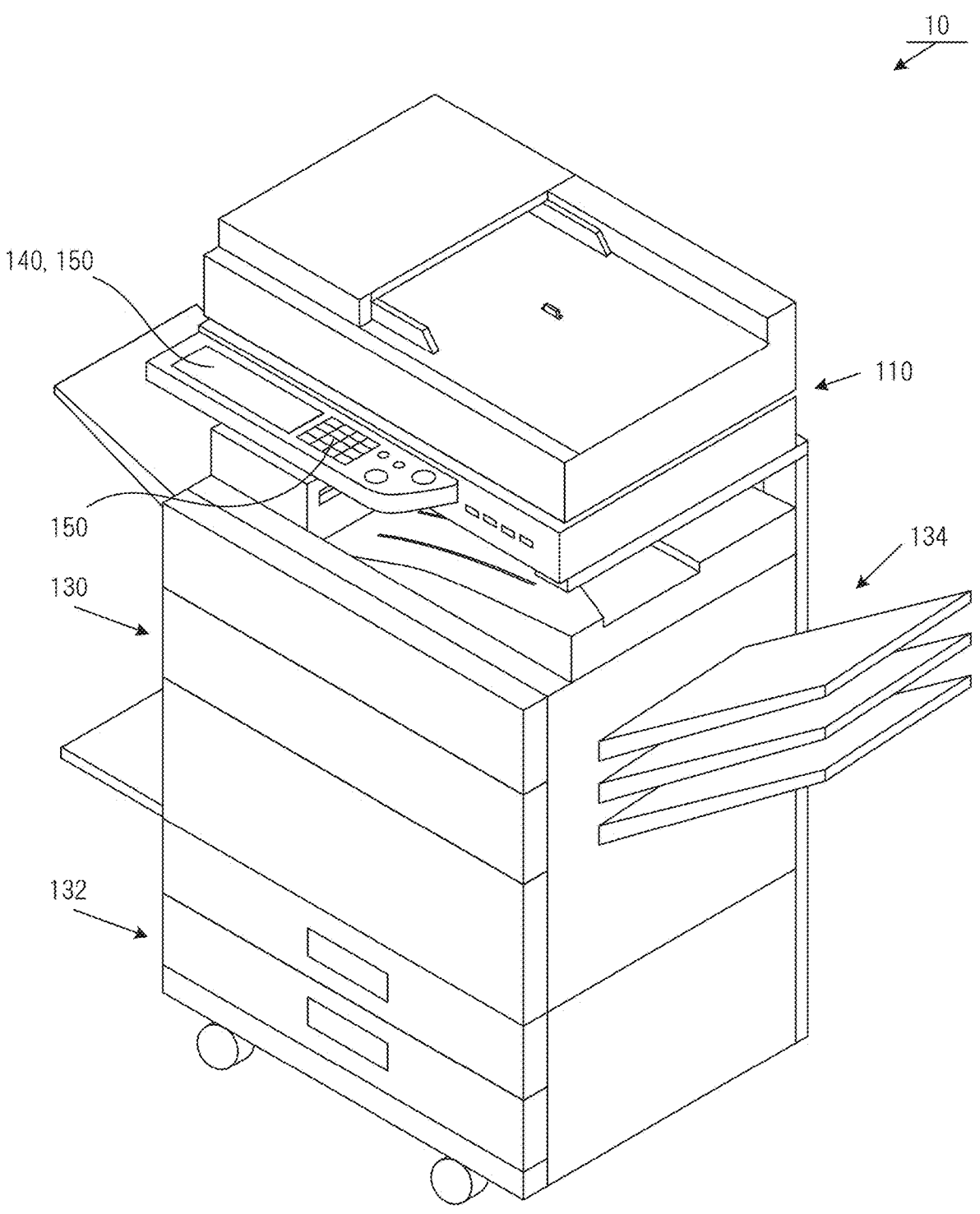
FIG. 1 is a perspective view of a multifunction peripheral according to a first embodiment.

A functional configuration of the multifunction peripheral 10 according to the present embodiment will be described with reference to FIGS. 1 and 2. FIG. 1 is an external perspective view of the multifunction peripheral 10, and FIG. 2 is a block diagram illustrating a functional configuration of the multifunction peripheral 10.

The multifunction peripheral 10 includes a controller 100, an image inputter 120, an image former 130, a display 140, an operation acceptor 150, a storage 160, and a communicator 190.

The controller 100 is a functional unit that controls the overall multifunction peripheral 10. The controller 100 reads and executes various programs stored in the storage 160 to perform various functions and includes, for example, one or more arithmetic devices (central processing units (CPUs)). Further, the controller 100 may be configured as a system-on-a-chip (SoC) having a plurality of functions among the functions described below.

The controller 100 executes programs stored in the storage 160 to function as an image processor 102, a character region extractor 104, a jaggy occurrence determiner 106, a gradation conversion method determiner 108, and an image output processor 110.

The image processor 102 performs processes regarding various images. For example, the image processor 102 executes a sharpening process and a gradation conversion process on an image input via the image inputter 120 or the communicator 190.

The character region extractor 104 extracts a character area (character region) from an image. The character area is a region including pixels forming a character in a region of the image and is a region (character candidate region) including pixels that are candidates for the pixels forming the character.

The character region extractor 104 may use, for example, the conventionally known technique above. According to the conventional technique, an image may be divided into a plurality of pixel blocks, it may be determined whether the pixel block is a foreground pixel block forming the foreground of the image, and furthermore a foreground region where the foreground pixel blocks continue may be extracted. It is also possible to extract regions of character strings formed of foreground regions in accordance with the distance and direction between the foreground regions. Therefore, the character region extractor 104 may use the conventional technique to first extract a foreground region from the region of the image and then separate the image region from other regions as background regions. Further, the character region extractor 104 may extract the character string region from the foreground region as the character region and separate other regions of the foreground region as photo regions. In this way, the character region extractor 104 may extract a character region from the image. The method described above is one example, and the character region extractor 104 may use various methods as long as the method extracts a character region from an image. For example, the foreground extraction process for highly compressed Portable Document Format (PDF) may be used.

Figure 10:
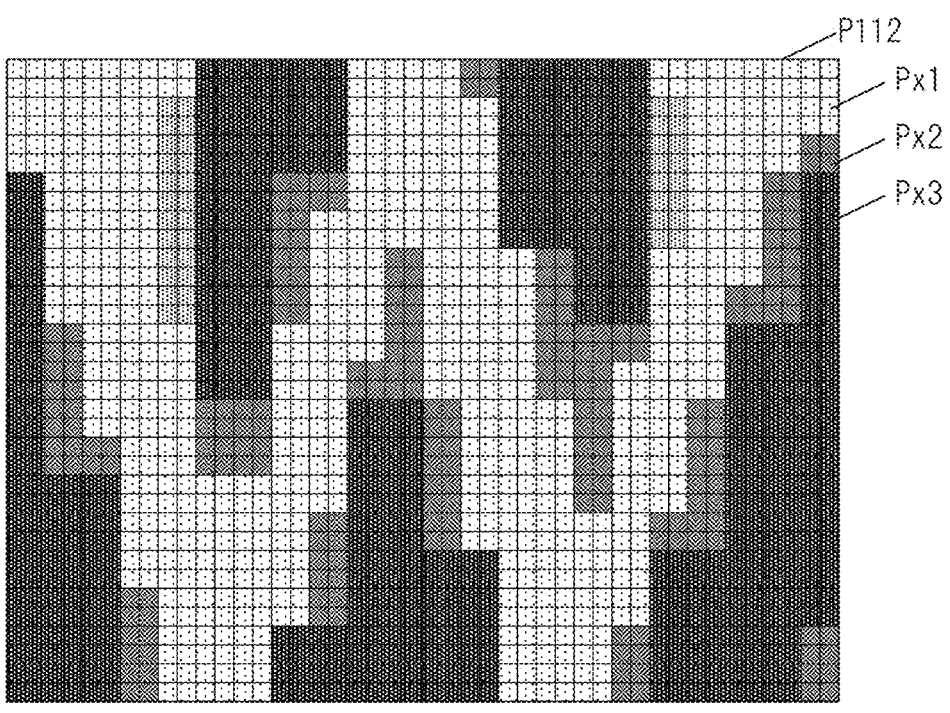
FIG. 10 is a diagram illustrating an operation example according to the first embodiment.

The character region extractor 104 may generate a character area map as the data indicating the location of the extracted character region. The character area map is the image indicating whether each block of the image is a character region. FIG. 10 illustrates an example of the character area map. FIG. 10 illustrates the image using the pixel values to indicate whether each pixel of the input image is a pixel included in the character region, especially the image of the character area map in the portion where the character "W" is written. Bright pixels (pixels Px1) in FIG. 10 indicate pixels forming the character, medium bright pixels (pixels Px2) in FIG. 10 indicate pixels located at the boundary portion between the character and the base, and dark pixels (pixels Px3) in FIG. 10 indicate pixels that do not form the character. In this case, the region formed by the bright pixels is a character region so that the region formed by the pixels forming the character may be identified as a character region. The region formed by the bright pixels and the medium bright pixels is a character region so that the region formed by the pixels forming the character and the peripheral portion (edge portion) of the character may be identified as a character region.

The character area map may indicate the probability of being a character region by using a pixel value. For example, in the example of FIG. 10, the pixel values in the character area map have values from 0 to 255, the pixel value of the pixel block that is likely to be a character region is 220, the pixel value of the pixel block that is moderately likely to be a character region is 180, and the pixel value of the pixel block that is less likely to be a character region is 30. That is, three types of values are used to indicate whether it is a character region. The likelihood of being a character region is determined in accordance with, for example, the characteristics of the pixels included in the pixel block of interest (e.g., the percentage of pixels having a density of 30% or less), the edge pixels included in the pixel block of interest, and the number of pixels among the edge pixels. In this way, the character region extractor 104 may use the character area map to indicate the positions of the pixels forming the inside (character portion) of the character and the positions of the pixels on the periphery of (near the edge of) the character.

The character region extractor 104 may store the generated character area map in a character area map storage area 164 of the storage 160.

When the image (hereinafter referred to as "input image") input to the multifunction peripheral 10 is a monochrome image, the jaggy occurrence determiner 106 determines whether a jaggy occurs in the image (hereinafter referred to as "output image") output after image processing for monochrome images is performed. The image processing for monochrome images is, for example, a color reduction process such as a simple binarization process. In the description according to the present embodiment, it is assumed that the image processing for monochrome images is a simple binarization process and the jaggy occurrence determiner 106 determines whether a jaggy occurs in the output image when the input image (simple binary image) having undergone the simple binarization process is output as the output image. The process performed by the jaggy occurrence determiner 106 will be described below.

The gradation conversion method determiner 108 determines the conversion method (gradation conversion method) for converting the gradation of the input image when the input image is output. The process performed by the gradation conversion method determiner 108 will be described below.

The image output processor 110 performs a process to output an image. The process performed by the image output processor 110 will be described below.

The image inputter 120 inputs an image to the multifunction peripheral 10. The image inputter 120 includes, for example, a scanner device that reads a document placed on a document table. The scanner device is, for example, a device that converts the image of a document into an electrical signal with an image sensor such as a charge coupled device (CCD) or a contact image sensor (CIS) and quantizes and encodes the electrical signal. The image inputter 120 may include an interface (terminal) to read an image stored in a universal serial bus (USB) memory and input an image read from the USB memory. The image inputter 120 may receive an image from another device via the communicator 190 and thus input the image.

The image former 130 forms (prints) an image on a recording medium such as recording paper. The image former 130 includes, for example, a printing device such as a laser printer using an electrophotographic system. For example, the image former 130 feeds recording paper from a paper feed tray 132 included in the multifunction peripheral 10, forms an image on a surface of the recording paper, and discharges the recording paper from a paper discharge tray 134 included in the multifunction peripheral 10.

The display 140 displays various types of information. The display 140 includes, for example, a display device such as a liquid crystal display (LCD), an organic electroluminescence (EL) display, or a micro light emitting diode (LED) display.

The operation acceptor 150 accepts an operation instruction from a user of the multifunction peripheral 10. The operation acceptor 150 includes an input device such as a key switch (hard key) and a touch sensor. A method for detecting an input by contact (touch) with the touch sensor may be any typical detection method, such a resistive method, an infrared method, an inductive method, or an electrostatic method. The multifunction peripheral 10 may be equipped with a touch panel in which the display 140 and the operation acceptor 150 are formed as a single unit.

The storage 160 stores various programs for operations of the multifunction peripheral 10 and various types of data. The storage 160 includes a storage device such as a solid state drive (SSD), which is a semiconductor memory, and a hard disk drive (HDD).

The storage 160 provides, as storage areas, an input image storage area 162 that stores input images, the character area map storage area 164 that stores character area maps, a comparison image storage area 166 that stores comparison images, and a difference image storage area 168 that stores difference images.

The comparison image stored in the comparison image storage area 166 is the image obtained by performing predetermined image processing on the input image and is the image to be compared when the difference image described below is generated. Thus, at least two types of comparison images are generated for one input image.

According to the present embodiment, an image (a first image) obtained by performing a process for monochrome images on the input image (multiple-value image) and an image (a second image) obtained by performing image processing on the input image when the input image is not a monochrome image are generated as comparison images. Specifically, the first image is the image obtained by performing a correction process, such as a sharpening process and a contrast correction process, and a simple binarization process on the input image and is the actual output image (the image having undergone the actual binary image generation process) when a monochrome image is output. The second image is the image obtained by performing only a correction process, such as a sharpening process and a contrast correction process, on the input image and omitting the simple binarization process. That is, the first image is a simple binary image, while the second image is a multiple-value image. The correction process on the image is a process to adjust the pixel values of the pixels included in the input image as a whole and, for example, is a process to remove or reduce the image characteristics caused due to the characteristics of the scanner device, or the like, and to suppress noise occurring in the input image. Processes other than the sharpening process and the contrast correction process described above may be performed as the correction process, and for example, the process may be performed to change the brightness or saturation of the image.

The difference image stored in the difference image storage area 168 is the image indicating the difference values of the pixel values on a pixel-by-pixel basis in the two types of comparison images. For example, the difference image is a grayscale image indicating, as pixel values, the differences in the brightness values of the second image with respect to the first image on a pixel-by-pixel basis.

For example, when the brightness value for each pixel in the first image and the second image is any value from 0 to 255, the difference in the brightness value is any value from 0 to 255. In this case, a pixel having no brightness difference in the second image with respect to the first image is a pixel (black pixel) having a pixel value of 0 in the difference image. Conversely, a pixel having a brightness difference in the second image with respect to the first image is a pixel having a pixel value corresponding to the brightness difference in the difference image. Therefore, the larger the brightness difference of the pixel in the second image with respect to the first image, the brighter the pixel will be in the difference image.

The storage 160 stores a setting table 170. The setting table 170 is a table that stores information about the settings of the multifunction peripheral 10. The setting table 170 is a table in which a setting item name is associated with a setting content set for the setting item, as illustrated in for example FIG. 3.

The setting table 170 according to the present embodiment stores the setting content below.

(1) The thresholds used for determining a block including a jaggy (2) The conditions used for classifying the high or low degree of a jaggy (3) The conditions used for determining the gradation conversion method A detailed description will be given below.

(1) The Thresholds Used for Determining a Block Including a Jaggy

The thresholds used for determining a block including a jaggy include a pixel value threshold (a first threshold, D100 in FIG. 3), a candidate pixel number threshold (a second threshold, D102 in FIG. 3), and a block number threshold (a third threshold, D104 in FIG. 3).

The pixel value threshold is a threshold for the pixel value of each pixel of the difference image. According to the present embodiment, among the pixels included in the difference image, the pixel having a pixel value equal to or more than the pixel value threshold is extracted as the jaggy occurrence location candidate pixel. The jaggy occurrence location candidate pixels are pixels having large differences in the pixel values in the two comparison images and are pixels that are likely to be recognized by the user that a jaggy has occurred in the image obtained by performing the process for monochrome images on the input image.

The candidate pixel number threshold is a threshold for the jaggy occurrence location candidate pixel in each block in the difference image divided into blocks (e.g., 8 pixels in height and 8 pixels in width). According to the present embodiment, the block having the number of jaggy occurrence location candidate pixels, which are included in the block, equal to or more than the candidate pixel number threshold is extracted as the block where a jaggy occurs.

The block number threshold is a threshold for the number of blocks where a jaggy occurs. According to the present embodiment, when the number of blocks where a jaggy occurs is equal to or more than the block number threshold, it is determined that a jaggy occurs in the output image due to the process for monochrome images on the input image.

(2) the Conditions Used for Classifying the High or Low Degree of a Jaggy

The conditions used for classifying the high or low degree (intensity) of a jaggy are the conditions used for classifying a block in accordance with the degree of the occurring jaggy. According to the present embodiment, the statistical amount is calculated by using the difference values within the block, and the statistical amount is compared with the conditions used for classifying the high or low degree of a jaggy so that the block is classified.

Here, the difference value on a pixel-by-pixel basis in the first image (simple binary image) and the second image (multiple-value image) appears in the difference image. The difference value appearing in the difference image is half-tone information that is lost when the simple binarization process is performed. Therefore, the pixel having a large difference value is considered to cause a jaggy. That is, the more pixels which have large difference values, the more likelihood there is of a jaggy, and the fewer pixels which have large difference values, the less likelihood there is of a jaggy. Therefore, according to the present embodiment, the magnitude of the difference value is evaluated by using the difference image indicating the difference of the second image with respect to the first image so that the high or low degree of the jaggy in the block is determined.

The magnitude of the difference value is evaluated based on the statistical amount calculated using the difference value. Typically, when there is a large difference between two images, the difference value or the absolute value of the difference value tends to be large. Therefore, the statistical value reflecting the overall magnitude of the difference values may be used as the statistical amount. Specifically, the sum (total), mean, median, or the like, of the difference values may be used as the statistical amount.

When there is a large difference between two images, the difference values or the dispersion of the difference values tend to be large. The reason for this is that, when there is a small difference between two images, the difference value or the absolute value of the difference value is close to 0 for almost all the pixels of the difference image, which results in a small dispersion, while when there is a large difference between two images, the difference image includes many pixels having values other than zero, which results in a large dispersion. Therefore, the statistical value reflecting the magnitude of dispersion in the difference values may be used as the statistical amount. Specifically, the variance value, standard deviate, entropy (information amount) value, and the like, of the difference values may be used.

In the case described according to the present embodiment, the entropy value is used as the statistical amount. In this case, a condition and a determination threshold may be previously set for entropy values, and blocks may be classified in accordance with the condition. For example, a determination threshold is set to determine whether the entropy value is in the small, medium, or large range, and the block is classified based on the determination threshold. For example, in a case where the condition illustrated in D106 in FIG. 3 is stored, when the entropy value of the block of interest is less than 1, it is determined that the degree of a jaggy in the block is "small". Similarly, when the entropy value of the block of interest is 1 or more and less than 3, it is determined that the degree of a jaggy in the block is "medium". When the entropy value of the block of interest is 3 or more, it is determined that the degree of a jaggy in the block is "high".

(3) The Conditions Used for Determining the Gradation Conversion Method

The gradation conversion method refers to an image processing method performed on an input image, especially the one including the process to convert the number of gradations in the input image. The conditions used for determining the gradation conversion method are the conditions to determine the image processing method performed on the input image when the input image is output in a case where it is determined that a jaggy occurs.

According to the present embodiment, there are the following three types of gradation conversion methods.

(a) Grayscale Method (a First Conversion Method)

The grayscale method is a method that converts an input image into an achromatic image and that converts each pixel of the input image into any one of a white (a density of 0%) pixel, a black (a density of 100%) pixel, and a color pixel having an intermediate density between white and black in accordance with the brightness of the pixel. There is no particular restriction on the number of color types having an intermediate density, but the number is desirably sufficient to represent a gradation from white to black. For example, when there are 254 types of intermediate-density colors, the input image is converted into a 256-gradation (white, black, and intermediate-density colors) image using the grayscale method.

(b) Error Diffusion Method (a Second Conversion Method)

The error diffusion method is a method that converts each pixel of the input image into either a white pixel or a black pixel. Specifically, the image obtained by conversion using the error diffusion method is a binary image, and the number of gradations of the image is two (two gradations). In the error diffusion method, the information on the difference (error) between the brightness value of the pixel of interest and the brightness value that is the threshold for the brightness of the pixel is propagated to the pixel adjacent to the pixel of interest. Then, based on the brightness value of the pixel of interest and the propagated error information, the color after conversion for the pixel of interest is determined.

(c) Gray Small-Number Color Method (a Third Conversion Method)

The gray small-number color method is a method that converts the input image into an achromatic image, where the number of gradations in the converted image is more than 2 and less than the number of gradations (e.g., 256) used for images converted by the grayscale method. For example, when the image is represented in 256 gradations by the grayscale method, the gray small-number color method represents the input image in the number of gradations such as 4, 8, or 16 gradations. The process to convert the image into a gray small-number color image is also referred to as black-and-white multiple-value (black-and-white small-number color) process. The black-and-white multiple-value process results in n gradations in the input image (2<n<the number of gradations in grayscale images).

In the example of FIG. 3, it is indicated that, when the number of blocks having "large" and "medium" degrees of jaggies with respect to the number of blocks for which it is determined that a jaggy occurs is 50% or more, it is determined that the gradation conversion method is the error diffusion method (D110 in FIG. 3). Further, it is indicated that, when the number of blocks having a "large" degree of jaggy with respect to the number of blocks for which it is determined that a jaggy occurs is 50% or more, it is determined that the gradation conversion method is the grayscale method (D112 in FIG. 3). In other cases, it is determined that the gradation conversion method is the gray small-number color method (D108 in FIG. 3).

The communicator 190 communicates with other devices and equipment, such as a terminal device 20, via a network such as a local area network (LAN) or wide area network (WAN). The communicator 190 includes a communication device or a communication module such as a network interface card (NIC) used for wired/wireless LAN, for example. The communicator 190 may include an interface (network I/F) that is connectable to a network. The communicator 190 may be connected to a communication network such as a public network, a LAN, or the internet and may send data externally by a communication method such as facsimile or e-mails via the communication network.

1.2 Process Flow

A process executed by the multifunction peripheral 10 will be described with reference to FIGS. 4 to 7. The process is executed by the multifunction peripheral 10 when the controller 100 reads a program stored in the storage 160. The processes described in FIGS. 4 to 7 are executed when functions that output input images, such as the scan function and the copy function, are used.

1.2.1 Main Process

Figure 4:
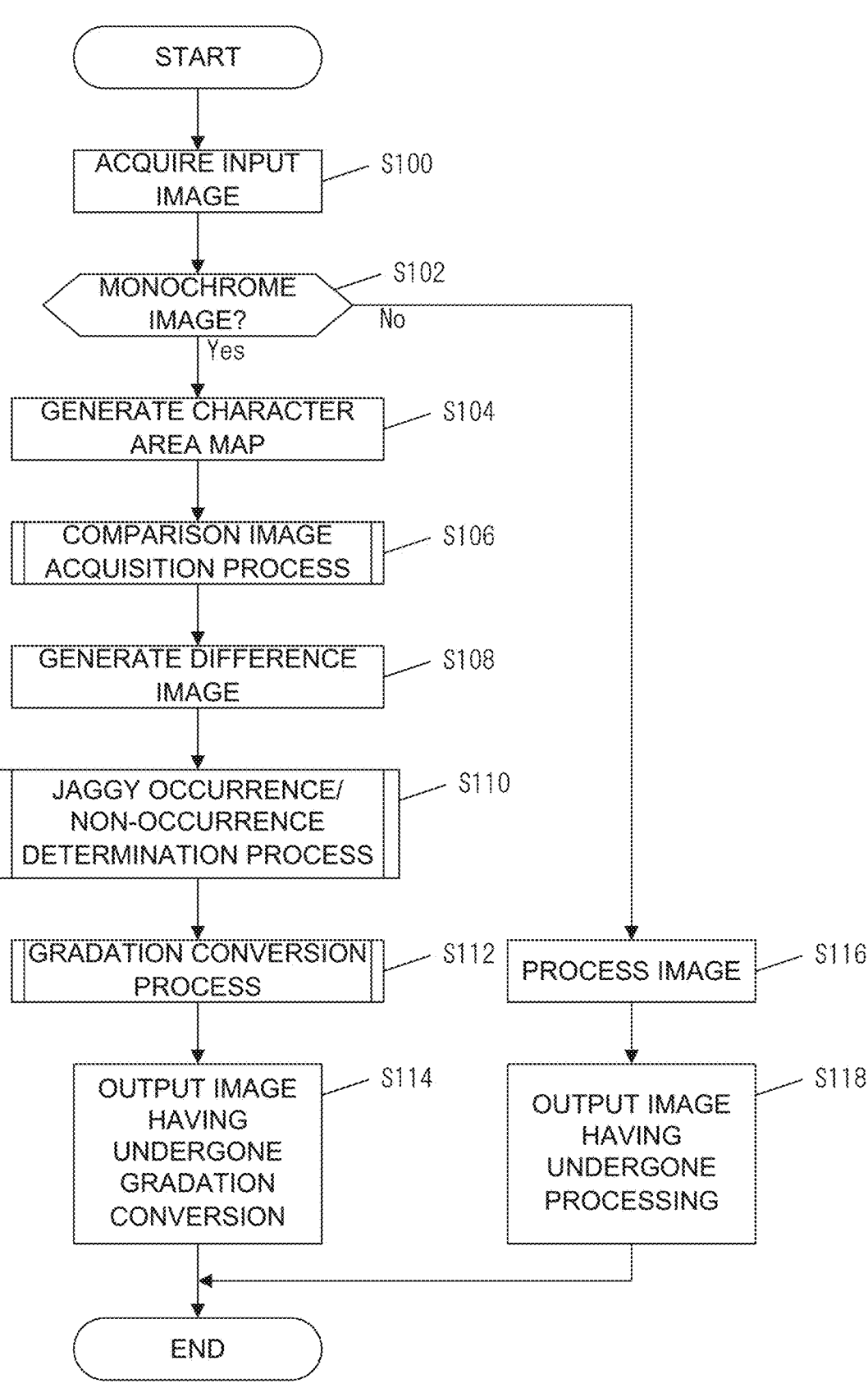
FIG. 4 is a flowchart of a main process according to the first embodiment.

With reference to FIG. 4, the flow of the primary process (main process) executed by the controller 100 will be described. First, the controller 100 acquires the input image (Step S100). For example, the controller 100 receives the image of a document placed on the document table via the image inputter 120 or the image received from another device via the communicator 190. The input image is typically a multiple-value image.

The controller 100 determines whether the input image, which is a multiple-value image, is a monochrome image (Step S102). Step S102 is a process to determine whether the input image is a monochrome image by what is called the Auto Color Selection (ACS) function. For example, the controller 100 acquires the total number of pixels and the total number of achromatic pixels from the image acquired in Step S100 and determines that the image is a monochrome image when the percentage of the achromatic pixels is equal to or more than a predetermined value.

When the input image is a monochrome image, the input image is a grayscale image or an image close to grayscale. Subsequently, the controller 100 (the character region extractor 104) generates a character area map (Step S102; Yes→Step S104). Here, the character region extractor 104 may store the character area map in the character area map storage area 164.

Subsequently, the controller 100 (the jaggy occurrence determiner 106) executes the process (comparison image acquisition process) to generate and thus acquire the comparison image (Step S106). The comparison image acquisition process will be described below. By executing the comparison image acquisition process, two types of comparison images are stored in the comparison image storage area.

Subsequently, the controller 100 (the jaggy occurrence determiner 106) generates a difference image (Step S108). For example, the jaggy occurrence determiner 106 uses the two types of comparison images generated in Step S106 to generate the difference image. Here, the jaggy occurrence determiner 106 may store the image data on the difference image in the difference image storage area 168.

Subsequently, the controller 100 (the jaggy occurrence determiner 106) performs the process (jaggy occurrence/non-occurrence determination process) to determine whether a jaggy occurs in the simple binary image when the simple binary image is output after image processing for monochrome images is executed on the input image (Step S110). The jaggy occurrence/non-occurrence determination process will be described below.

Subsequently, the controller 100 executes the process (gradation conversion process) to convert the gradation of the input image based on the determination result of the jaggy occurrence/non-occurrence determination process in Step S110 (Step S112). The gradation conversion process will be described below.

Subsequently, the controller 100 (the image output processor 110) outputs the image (output image) having undergone the conversion in Step S112 (Step S114). For example, the image output processor 110 outputs the output image by controlling the image former 130 to form the output image on a recording medium, storing the output image in the storage 160, or sending the output image to another device via the communicator 190.

Conversely, when the input image is not a monochrome image in Step S102, the controller 100 (the image output processor 110) executes predetermined image processing on the input image (Step S102; No→Step S116). The predetermined image processing is, for example, a sharpening process or a contrast correction process.

The controller 100 (the image output processor 110) outputs the image having undergone the image processing in Step S116 (Step S118). The process in Step S118 is similar to the process in Step S114.

1.2.2 Comparison Image Acquisition Process

Figure 5:
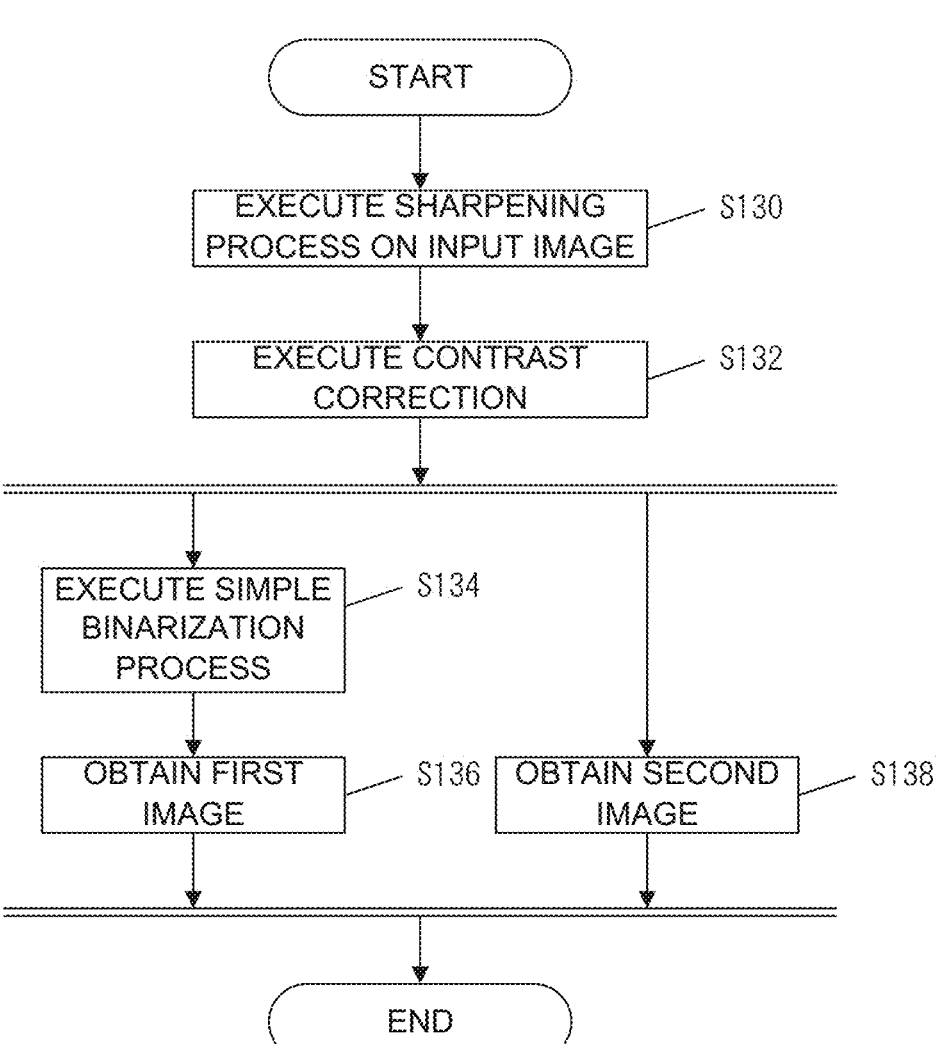
FIG. 5 is a flowchart of a comparison image acquisition process according to the first embodiment.

With reference to FIG. 5, the comparison image acquisition process executed by the jaggy occurrence determiner 106 will be described. First, the jaggy occurrence determiner 106 executes the sharpening process on the input image via the image processor 102 (Step S130). For example, the jaggy occurrence determiner 106 applies a spatial filter to the input image via the image processor 102 to sharpen the input image.

Subsequently, the jaggy occurrence determiner 106 further executes contrast correction on the input image having undergone the sharpening process (Step S132). For example, the jaggy occurrence determiner 106 corrects the contrast of the input image via the image processor 102 to convert a light gray pixel into a white pixel or a dark gray pixel into a black pixel. Thus, as the correction process for the input image, the sharpening process is followed by the contrast correction process, which may suppress noise in the input image and may make printed pixels clear.

Subsequently, the jaggy occurrence determiner 106 executes a simple binarization process on the input image having undergone contrast correction (Step S134). The jaggy occurrence determiner 106 obtains the data on the input image having undergone the sharpening process, contrast correction, and the simple binarization process as a first image (Step S136). Here, the jaggy occurrence determiner 106 may store the image data on the first image in the comparison image storage area.

Apart from the processes in Steps S134 and S136, the jaggy occurrence determiner 106 obtains the data on the input image having undergone the sharpening process and contrast correction as a second image (Step S138). That is, the second image is the data on the image that has not undergone the simple binarization process. Here, the jaggy occurrence determiner 106 may store the image data on the second image in the comparison image storage area. Step S138 may be executed in parallel with Steps S134 and S136 or may be executed after the processes in Steps S134 and S136.

The above causes the generation of the first image obtained by performing the correction process, such as the sharpening process or the contrast correction, and the simple binarization process on the input image, which is a multiple-value image, and the second image obtained by performing the correction process on the data on the input image.

1.2.3 Jaggy Occurrence/Non-Occurrence Determination Process

Figure 6:
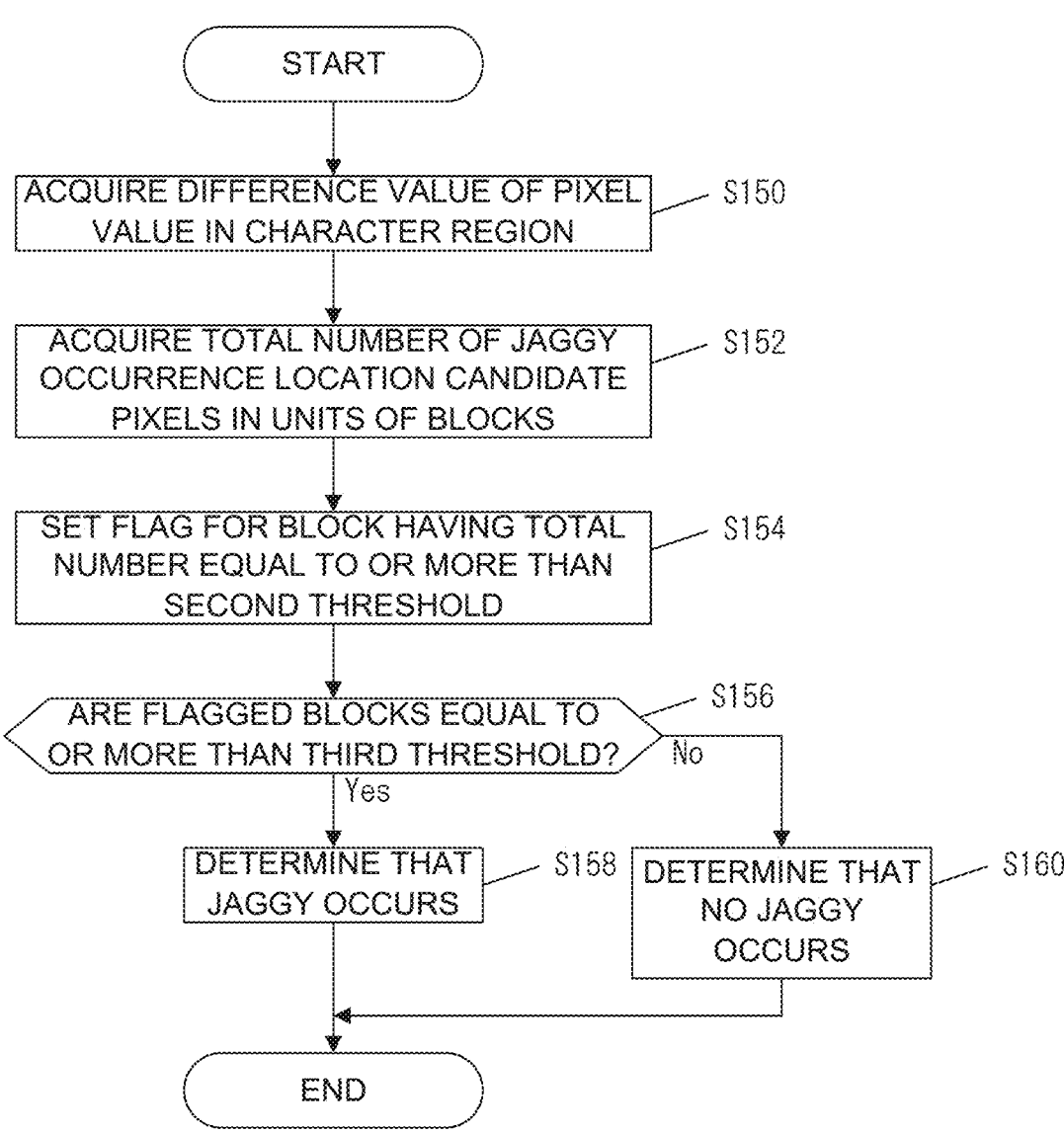
FIG. 6 is a flowchart of a jaggy occurrence/non-occurrence determination process according to the first embodiment.

With reference to FIG. 6, the jaggy occurrence/non-occurrence determination process executed by the jaggy occurrence determiner 106 of the controller 100 will be described. First, the jaggy occurrence determiner 106 acquires the difference value of the pixel value of the comparison image in the character region of the input image (Step S150). Here, as the character area map is generated in Step S104 of FIG. 4, the jaggy occurrence determiner 106 may determine that, for example, the region including the pixels having the pixel values of more than 175 in the character area map is a character region. Further, as the difference image is generated in Step S108 of FIG. 4, the jaggy occurrence determiner 106 may acquire the pixel value of the pixel that is located in the character region among the pixels of the comparison image as the difference value of the pixel value in the character region.

Subsequently, the jaggy occurrence determiner 106 acquires the total number of jaggy occurrence location candidate pixels (pixels having the difference values equal to or more than the first threshold) in units of blocks (Step S152). The jaggy occurrence location candidate pixel is a candidate pixel in the location where a jaggy occurs in the output image. Specifically, the jaggy occurrence determiner 106 performs the following process.

The jaggy occurrence determiner 106 divides the comparison image into blocks having a predetermined size (e.g., blocks of 8 pixels in height and 8 pixels in width).

The jaggy occurrence determiner 106 determines, for each block, that the pixel having the pixel value equal to or more than the first threshold is a jaggy occurrence location candidate pixel among the pixels in the character region included in the block.

The jaggy occurrence determiner 106 counts the number of jaggy occurrence location candidate pixels for each block.

In this way, the jaggy occurrence determiner 106 uses the difference value between the simple binary image (the first image) and the grayscale image (the second image) as an evaluation value and extracts a jaggy occurrence location candidate pixel by the threshold process of the difference value.

Subsequently, the jaggy occurrence determiner 106 performs the process to set a flag for the block whose total number of jaggy occurrence location candidate pixels is equal to or more than the second threshold as the block of "a jaggy occurs" (Step S154). For example, the jaggy occurrence determiner 106 compares the number of jaggy occurrence location candidate pixels within the block with the second threshold for each block. Here, the jaggy occurrence determiner 106 temporarily stores, in the storage 160, the position of the block in which the number of jaggy occurrence location candidate pixels within the block is equal to or more than the second threshold. Thus, the jaggy occurrence determiner 106 may determine that the block corresponding to the position of the block stored in the storage 160 is the flagged block after the comparison is performed for all the blocks.

Subsequently, the jaggy occurrence determiner 106 determines whether the number of flagged blocks is equal to or more than the third threshold (Step S156). When the number of flagged blocks is equal to or more than the third threshold, the jaggy occurrence determiner 106 determines that a jaggy occurs due to the image processing for monochrome images on the input image (Step S156; Yes→Step S158). Conversely, when the number of flagged blocks is not equal to or more than the third threshold, the jaggy occurrence determiner 106 determines that no jaggy occurs due to the image processing for monochrome images on the input image (Step S156; No→Step S160).

Thus, the jaggy occurrence determiner 106 may count the frequency of jaggy occurrence (jaggy occurrence location candidate pixels) and determine that a jaggy occurs only when the frequency is high to some extent. Here, during the processes in Steps S154 and S156, the jaggy occurrence determiner 106 makes a determination in units of blocks and thus may determine whether a jaggy occurs based on the number of blocks for which it is considered that a jaggy occurs. The determination in units of blocks may prevent the jaggy occurrence determiner 106 from reacting to the occurrence of subtle jaggies.

In Step S150, the jaggy occurrence determiner 106 acquires the difference value of the pixel included in the character region of the input image and uses the acquired difference value to perform the determination process from Steps S152 to S156. That is, the jaggy occurrence determiner 106 may use only the pixel included in the character region to detect the occurrence of a jaggy and may determine the occurrence/non-occurrence of a jaggy from the perspective of the occurrence of a jaggy in the character.

1.2.4 Gradation Conversion Process

Figure 7:
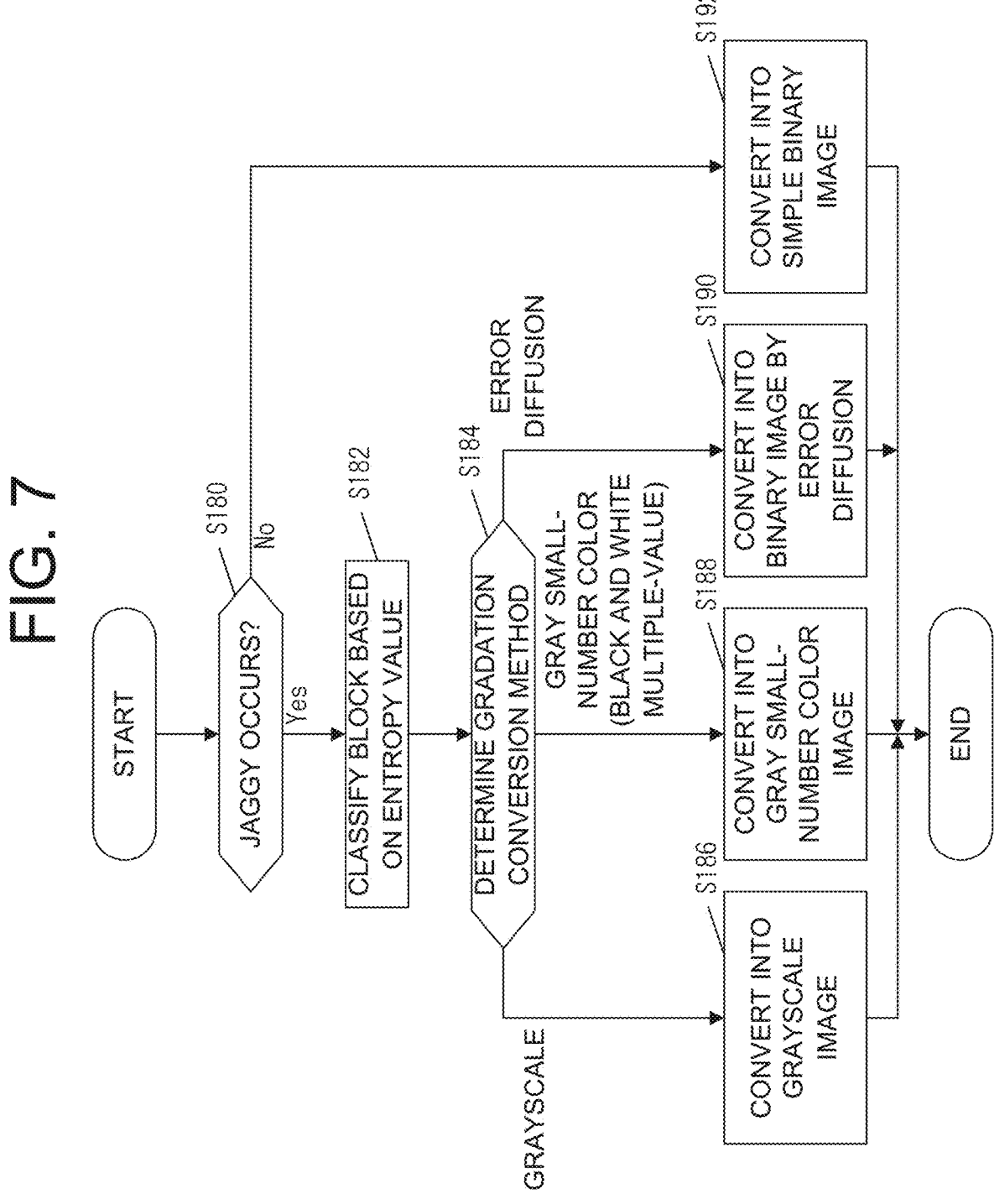
FIG. 7 is a flowchart of a gradation conversion process according to the first embodiment.

With reference to FIG. 7, the gradation conversion process will be described. First, the controller 100 (the gradation conversion method determiner 108) determines whether the jaggy occurrence/non-occurrence determination result indicates "a jaggy occurs" (Step S180).

Here, when the jaggy occurrence/non-occurrence determination result indicates "a jaggy occurs", the gradation conversion method determiner 108 of the controller 100 needs to avoid the occurrence of a jaggy. That is, when it is determined that a jaggy occurs due to the simple binarization process on the input image, the gradation conversion method determiner 108 switches the image processing to be performed on the input image to a process other than the image processing for monochrome images (simple binarization process).

Therefore, when the jaggy occurrence/non-occurrence determination result indicates "a jaggy occurs", the controller 100 (the gradation conversion method determiner 108) classifies the block based on the entropy value (Step S180; Yes→Step S182).

For example, for each block of the difference image, the gradation conversion method determiner 108 uses the pixel values (difference values) in the block to calculate (acquire) the histogram of the difference values and uses the histogram to calculate entropy (amount of information). The histogram calculation may be performed simultaneously with the process after Step S150 in FIG. 6.

Furthermore, the gradation conversion method determiner 108 evaluates the entropy value based on the setting of the degree of jaggy stored in the setting table 170 and thus classifies the degree of jaggy in the block of interest. That is, for each block, the entropy value is evaluated, and it is determined whether it is in the small, medium, or large range by threshold determination, or the like. Accordingly, the block may be classified into any one of a block in the large range where the degree of j aggies is high, a block in the medium range where the degree of j aggies is medium, and a block in the small range where the degree of j aggies is low.

Subsequently, the controller 100 (the gradation conversion method determiner 108) determines the gradation conversion method in accordance with the classification in Step S182 (Step S184). For example, the gradation conversion method determiner 108 counts the blocks classified in Step S182 based on the size of the range and calculates the respective percentages of the blocks in the large range, the blocks in the medium range, and the blocks in the small range. Subsequently, the gradation conversion method determiner 108 compares the calculated percentage with the conditions, which are used for determining the gradation conversion method and stored in the setting table 170, to determine the gradation conversion method.

Subsequently, the controller 100 (the image processor 102) converts the input image according to the gradation conversion method determined in Step S184. Specifically, when it is determined that the gradation conversion method is a grayscale method, the controller 100 (the image processor 102) converts the input image into a grayscale image (Step S184; grayscale→Step S186). When it is determined that the gradation conversion method is the gray small-number color (black-and-white multiple-value) method, the controller 100 (the image processor 102) converts the input image into a gray small-number color image (Step S184; gray small-number color→Step S188). When it is determined that the gradation conversion method is the error diffusion method, the controller 100 (the image processor 102) converts the input image into a binary image by error diffusion (Step S184; error diffusion→Step S190).

Conversely, when the jaggy occurrence/non-occurrence determination result does not indicate "a jaggy occurs" in Step S180, there is no need to avoid the occurrence of a jaggy, and the image processing for monochrome images may be subsequently performed. Therefore, the controller 100 (the image processor 102) converts the input image into a simple binary image (Step S180; No→Step S192).

As described above, when the input image is a monochrome image and even a jaggy occurs due to the image processing for monochrome images, the controller 100 may convert the input image into an image having more than two gradations or into a binary image by error diffusion.

1.3 Operation Example

Figure 8:
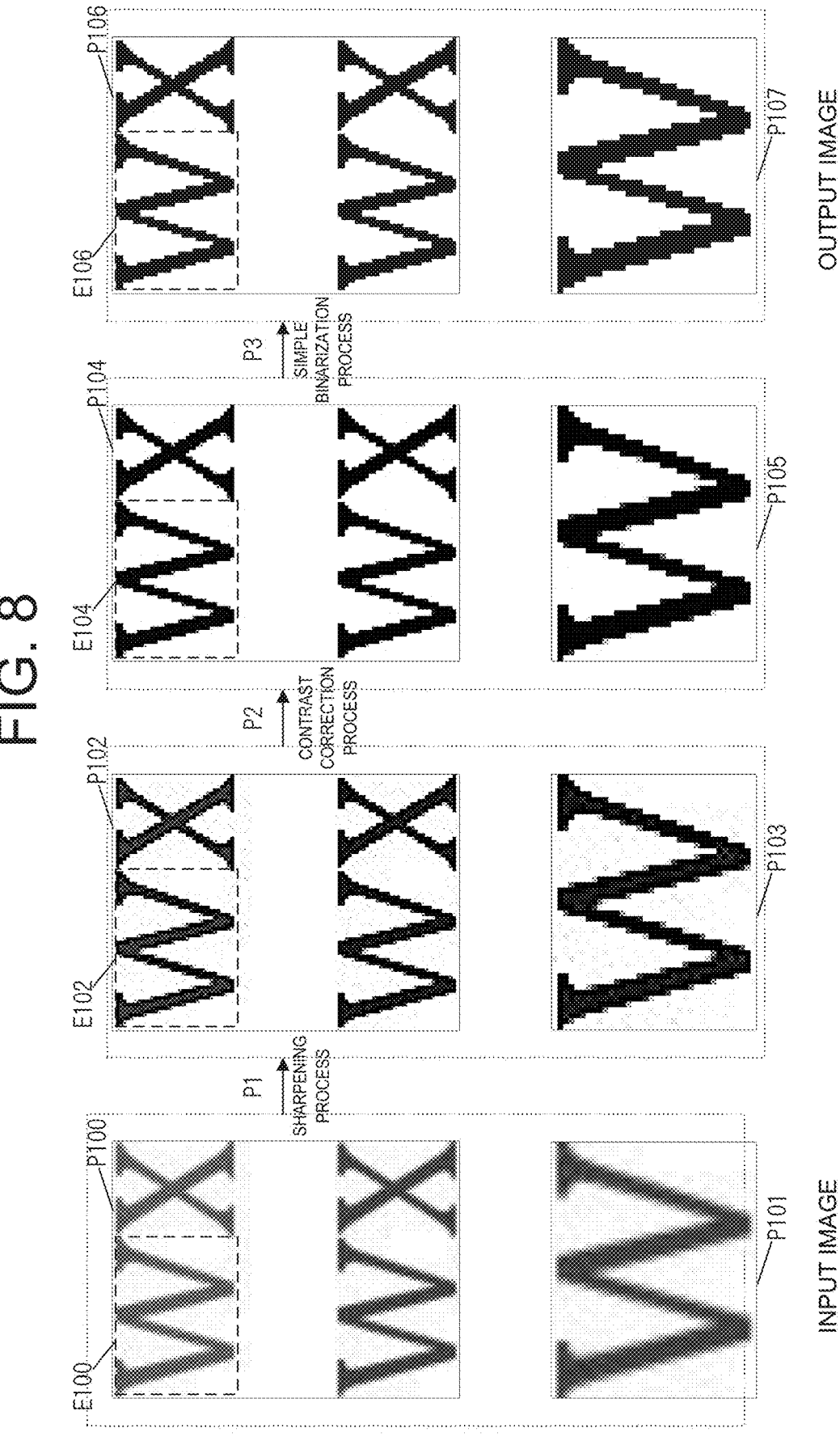
FIG. 8 is a diagram illustrating an operation example according to the first embodiment.

With reference to FIGS. 8 to 11, an operation example according to the present embodiment will be described. FIG. 8 is a diagram illustrating changes in the image from when the image is input to when the image is output.

An image P100 in FIG. 8 represents the input image. An image P101 is an enlarged view of a region E100 in the image P100. At the stage when the image is input, the edge portions of the character include many halftone pixels.

An image P102 in FIG. 8 is the image after the sharpening process is performed on the image P100 (P1 in FIG. 8). An image P103 is an enlarged view of a region E102 in the image P102. The sharpening process highlights the edge portions of the character.

An image P104 in FIG. 8 is the image after the contrast correction process is performed on the image P102 (P2 in FIG. 8). An image P105 is an enlarged view of a region E104 in the image P104. The contrast is corrected so that halftone pixels close to white become white and halftone pixels close to black become black.

An image P106 in FIG. 8 is the image after the simple binarization process is performed on the image P104 (P3 in FIG. 8). An image P107 is an enlarged view of a region E106 in the image P106. The image on which the simple binarization process has been performed is the output image when the input image is a monochrome image and there is no need to avoid the occurrence of a jaggy.

Figure 9:
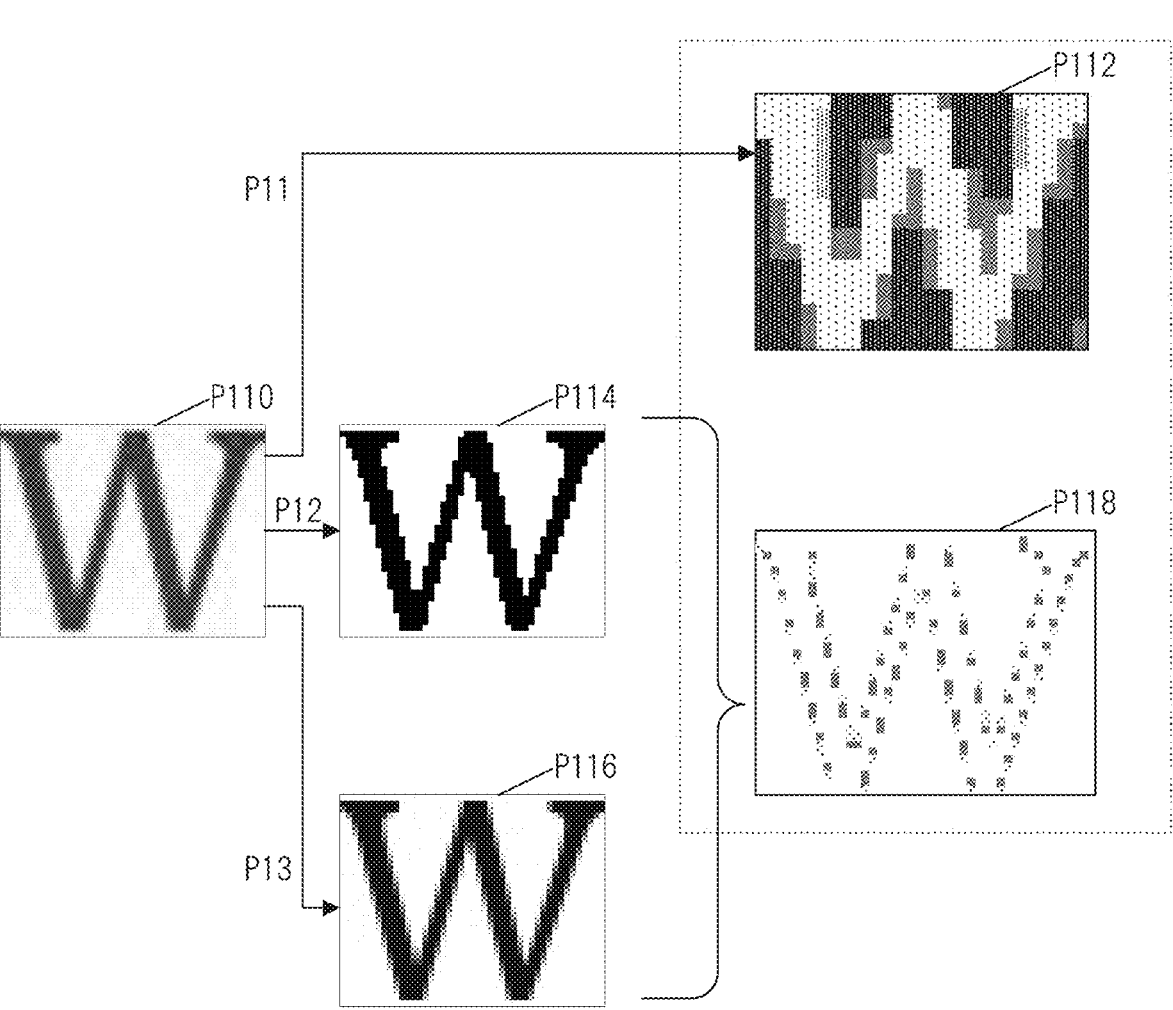
FIG. 9 is a diagram illustrating an operation example according to the first embodiment.

FIG. 9 is a diagram illustrating the input image and the image generated during the process according to the present embodiment. An image P110 is an input image. A character area map P112 is generated for the image P110 (P11 in FIG. 9). A first image P114 (P12 in FIG. 9) and a second image P116 (P13 in FIG. 9) are generated from the image P110 as data on comparison images. Furthermore, a difference image P118 is generated from the first image P114 and the second image P116. In the difference image P118, the pixel having a difference value of 0 is indicated as a white pixel. Therefore, the colored pixels in the difference image P118 are pixels having difference values more than 0.

According to the present embodiment, the difference image P118 is compared with the character area map P112, and the pixel values (difference values) of the difference image in the character region may be used to determine whether the occurrence of a jaggy is to be avoided.

FIG. 10 is an enlarged view of the character area map P112 in FIG. 9. The character area map P112 includes pixels having a low density (a pixel value of 220) to indicate the positions of the pixels forming the character, pixels having a density (a pixel value of 180) enough to indicate the positions of the pixels on the periphery (edge) of the character, and pixels having a high density (a pixel value of 30) to indicate the positions of the pixels that do not form the character. With regard to the character area map P112, for example, the region including the pixels having pixel values more than 175 is a character region so that the character region in the input image is determined.

Figure 11:
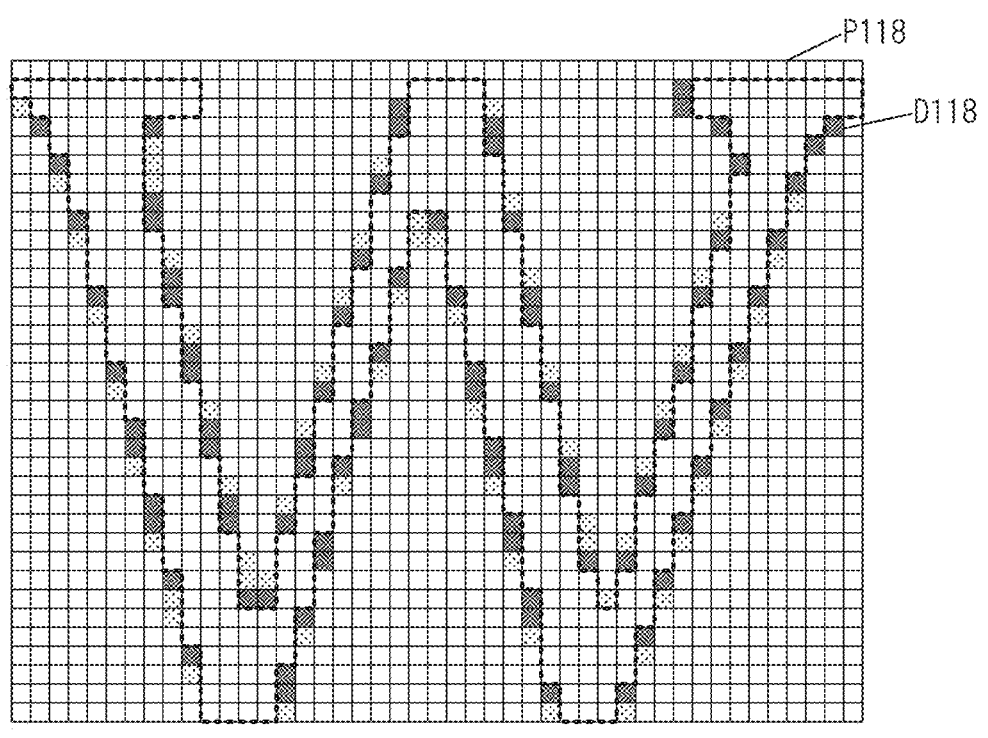
FIG. 11 is a diagram illustrating an operation example according to the first embodiment.

FIG. 11 is an enlarged view of the difference image P118 in FIG. 9. The dotted line portions in FIG. 11 indicate the positions of the pixels forming the character. D118 in FIG. 11 represents the pixels where there is a difference between the first image P114 and the second image P116 (pixels having difference values more than 0). As illustrated in FIG. 11, the pixels having differences appear on the periphery of the character. According to the present embodiment, the difference value of the pixel having a difference is the target to be evaluated, and it is determined whether to avoid the occurrence of a jaggy. When there is a need to avoid the occurrence of a jaggy, the gradation conversion method is determined in accordance with the statistical amount of the difference value.

In the description above, the gradation conversion method is determined in accordance with the percentage of blocks classified according to the ranges but may be determined by other methods. For example, the gradation conversion method determiner 108 may multiply the number of blocks in the large range, the number of blocks in the medium range, and the number of blocks in the small range by respective coefficients to apply weights and then sums the weighted numbers to determine the gradation conversion method. The gradation conversion method may be determined based on the range having the most classified blocks among the large range, the medium range, and the small range.

In the description above, the input image is converted into a grayscale image in Step S186 of FIG. 7; however, the input image may be converted into a grayscale image when it is determined to be a monochrome image in Step S102 of FIG. 4. In this case, as the comparison image is a grayscale image, when the difference image is generated, the difference value of the pixel value for each pixel may be obtained by simply subtracting the pixel value in the comparison image. As the input image is a grayscale image before the gradation conversion process in FIG. 7 is executed, when it is determined that the gradation conversion method is the grayscale method in Step S184 of FIG. 7, the image processor 102 may omit the process in Step S186 (skip the process). That is, the image processor 102 skips the binarization and color reduction (low gradation) process.

Some of the above description may also be executed by a device other than the multifunction peripheral 10. For example, in the description, the comparison image and the difference image are generated by the multifunction peripheral 10 and thus acquired; however, the comparison image and the difference image may be generated by another device connected to the multifunction peripheral 10, and the comparison image and the difference image generated may be received by the multifunction peripheral 10. The process of determining whether a jaggy occurs based on the difference image may be executed by another device connected to the multifunction peripheral 10, and the execution result (determination result) may be received by the multifunction peripheral 10.

As described above, the multifunction peripheral according to the present embodiment may determine whether there is a degradation in the image quality for an aliasing portion (jaggy) on the edge of a character in the image that is determined to be a monochrome image by the auto color selection (ACS) function when scanning or copying is executed and that is binarized after various types of image processing such as sharpening and contrast correction are performed. When there is a degradation in the image quality, the multifunction peripheral according to the present embodiment may select the gradation conversion method during the gradation conversion process in accordance with the degree of image quality degradation (degree of jaggy) and thus control the gradation conversion process (gradation correction process). This may achieve an appropriate gradation reproduction process and prevent image degradation. Here, the gradation conversion method is selected based on the evaluation using the frequency of occurrence of jaggies, the intensity, or the like, as indexes so that the appropriate gradation conversion method is selected.

According to the present embodiment, unlike conventional techniques, pattern matching is not performed, and jaggies are detected and the gradation correction process is controlled by simply adding a few processes and controlling the processes during the image processing for binarization. According to the present embodiment, this eliminates the need for the process to detect a jaggy on a pixel-by-pixel basis and determine the occurrence of a jaggy and a memory that stores a pattern used for detecting a jaggy. According to the present embodiment, as compared with the conventional technique, less processes and hardware are needed, which may reduce a processing time and minimize increases in the cost of hardware.

Based on the character region information, the multifunction peripheral according to the present embodiment uses the difference between the input image and the output image to determine whether a jaggy occurs in the output image. This makes it possible to detect the occurrence of a jaggy, especially in a portion of the character. When there is a need to avoid the occurrence of a jaggy, the gradation correction method is switched so that it is possible to switch to an appropriate gradation conversion process in consideration of its effect on the image quality.

2. Second Embodiment

Next, a second embodiment will be described. According to the second embodiment, the conditions used for determining the gradation conversion method are changed in accordance with the priority to the file size of the output image or the image quality of the output image during the gradation conversion process according to the first embodiment. According to the present embodiment, FIG. 3 in the first embodiment is replaced with FIG. 12, and FIG. 7 in the first embodiment is replaced with FIG. 13. The identical process is denoted by the identical reference sign, and its description is omitted.

2.1 Functional Configuration

FIG. 12 is a table illustrating an example of the setting table 170 according to the present embodiment. According to the present embodiment, the setting table 170 includes an output mode (D200 in FIG. 12) indicating whether the priority is given to either the file size of the output image or the image quality of the output image.

The setting table 170 stores the conditions (D202 in FIG. 12) used for determining the gradation conversion method when the priority is given to the file size of the output image (file size priority) and the conditions (D204 in FIG. 12) used for determining the gradation conversion method when the priority is given to the image quality of the output image (image quality priority).

In the example of FIG. 12, the case of file size priority has the settings such that the gradation conversion method is selected in the following priority order: the gray small-number color method (the third conversion method), the error diffusion method (the second conversion method), and then the grayscale method (the first conversion method). That is, in the settings, the gray small-number color method is likely to be selected.

Conversely, in the example of FIG. 12, the case of image quality priority has the settings such that the gradation conversion method is selected in the following priority order: the grayscale method (the first conversion method), the error diffusion method (the second conversion method), and then the gray small-number color method (the third conversion method). That is, in the settings, the grayscale method is likely to be selected.

The output mode and the conditions used for determining the gradation conversion method in each output mode may be predetermined or previously set by users. For example, the controller 100 displays a setting screen on the display 140 in response to a user operation and stores the conditions used for determining the output mode and the gradation conversion method in each output mode in the setting table 170 based on the setting content input by the user via the setting screen.

2.2 Process Flow

Figure 13:
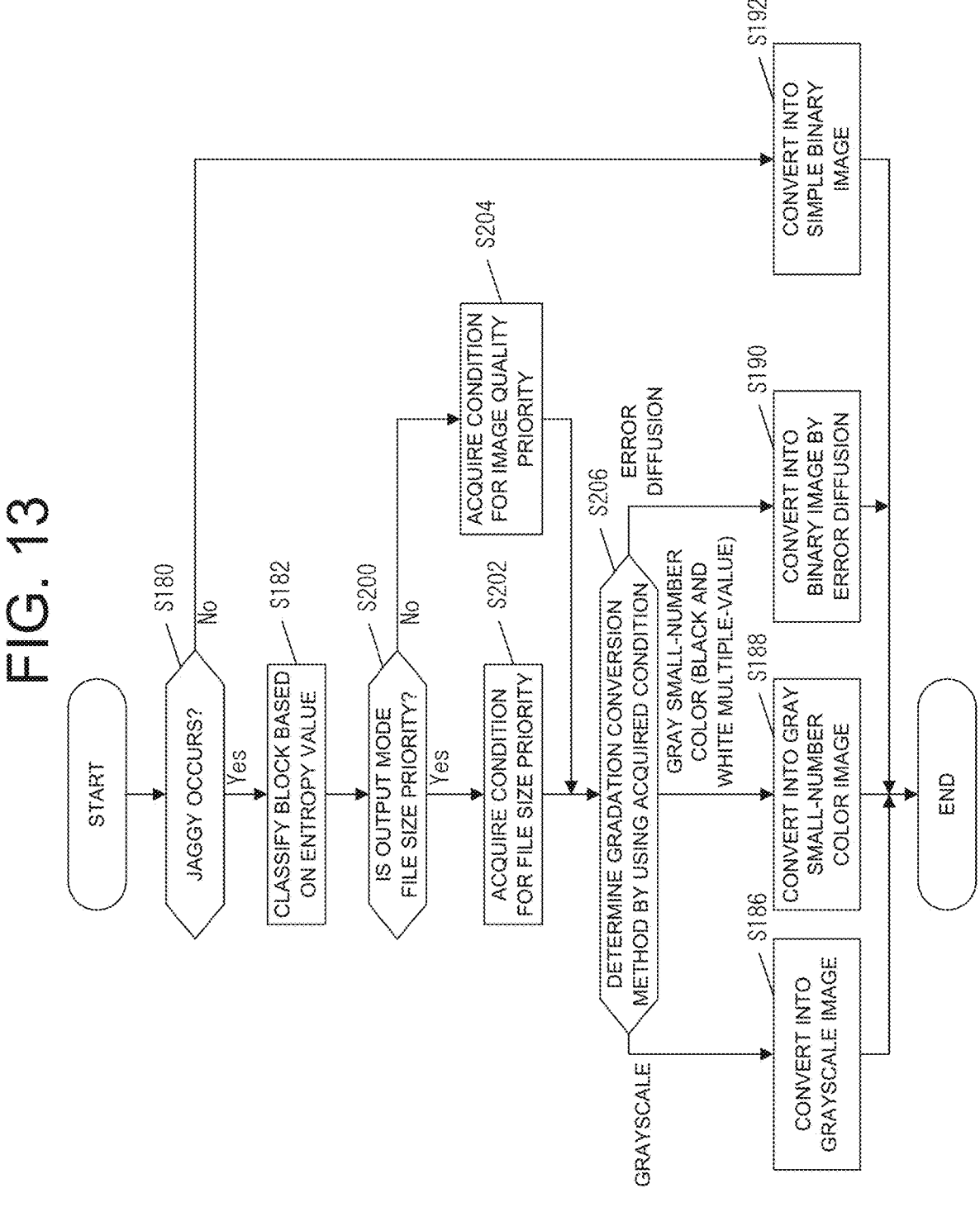
FIG. 13 is a flowchart of a gradation conversion process according to the second embodiment.

FIG. 13 is a flowchart illustrating the flow of a gradation conversion process according to the present embodiment. According to the present embodiment, after the process in Step S182, the gradation conversion method determiner 108 determines the gradation conversion method based on the conditions used for determining the gradation conversion method in accordance with the output mode. Specifically, the gradation conversion method determiner 108 determines whether the output mode is the file size priority (Step S182→Step S200). When the output mode is the file size priority, the gradation conversion method determiner 108 acquires the conditions used for determining the gradation conversion method corresponding to the file size priority (Step S200; Yes→Step S202). Conversely, when the output mode is the image quality priority, the gradation conversion method determiner 108 acquires the conditions used for determining the gradation conversion method corresponding to the image quality priority (Step S200; No→Step S204). Accordingly, when the output mode is "file size priority", the gradation conversion method determiner 108 may determine the gradation conversion method based on the priority order to determine the method for converting the input image, i.e., the third conversion method, the second conversion method, and then the first conversion method. When the output mode is "image quality priority", the gradation conversion method determiner 108 may determine the gradation conversion method based on the priority order to determine the method for converting the input image, i.e., the first conversion method, the second conversion method, and then the third conversion method.

Subsequently, the gradation conversion method determiner 108 determines the gradation conversion method in accordance with the classification in Step S182 and the conditions used for determining the gradation conversion method acquired in Step S202 or Step S204 (Step S206).

This allows the gradation conversion method determiner 108 to change the priority order of the gradation conversion process when priority is given to the file size of the output image and when priority is given to the image quality of the output image.

In the description above, priority is given to either the file size of the output image or the image quality of the output image, but the settings for the output image may be specified by a method other than the above. For example, the multi-function peripheral 10 may enable selection of any of five levels as the settings for the output image, i.e., image quality priority, slightly image quality priority, standard, slightly file size priority, and file size priority, and may switch the conditions used for determining the gradation conversion method in accordance with the selected content. This allows the multifunction peripheral 10 to switch the priority order of the gradation conversion method and the easiness of selection for the gradation conversion method depending on the settings for the output image.

Thus, the multifunction peripheral according to the present embodiment may switch the priority order of the gradation conversion method to be selected when the priority is given to the file size of the output image and when priority is given to the image quality of the output image and may output the output image appropriately.

3. Third Embodiment

Next, a third embodiment will be described. According to the third embodiment, the detection level of the occurrence of a jaggy may be changed during the jaggy occurrence/non-occurrence determination process according to the first embodiment. According to the present embodiment, FIG. 3 in the first embodiment is replaced with FIG. 14, and FIG. 6 in the first embodiment is replaced with FIG. 15. The identical process is denoted by the identical reference sign, and its description is omitted.

3.1 Functional Configuration

FIG. 14 is a table illustrating an example of the setting table 170 according to the present embodiment. According to the present embodiment, the setting table 170 includes a jaggy detection level (D300 in FIG. 14). The jaggy detection level indicates how likely it is to be determined that the occurrence of a jaggy needs to be avoided. The jaggy detection level is, for example, any of the following: high, slightly high, standard, slightly low, and low. In this case, the "high" jaggy detection level indicates that the occurrence of a jaggy is likely to be determined, while the "low" jaggy detection level indicates that the occurrence of a jaggy is unlikely to be determined.

According to the present embodiment, different values are set as the third thresholds depending on the jaggy detection level (D302 in FIG. 14). In the example of FIG. 14, when the jaggy detection level is "high" and when the number of flagged blocks is 30 or more, it is determined that jaggies occur. Conversely, when the jaggy detection level is "low" and when the number of flagged blocks is 400 or more, it is determined that jaggies occur. Accordingly, it is easier to determine the occurrence of a jaggy as the jaggy detection level increases.

The jaggy detection levels and the third thresholds corresponding to the jaggy detection levels may be predetermined or previously set by users. For example, the controller 100 may display a setting screen on the display 140 in response to a user operation and enable the setting of the jaggy detection levels and the third thresholds via the setting screen.

3.2 Process Flow

Figure 15:
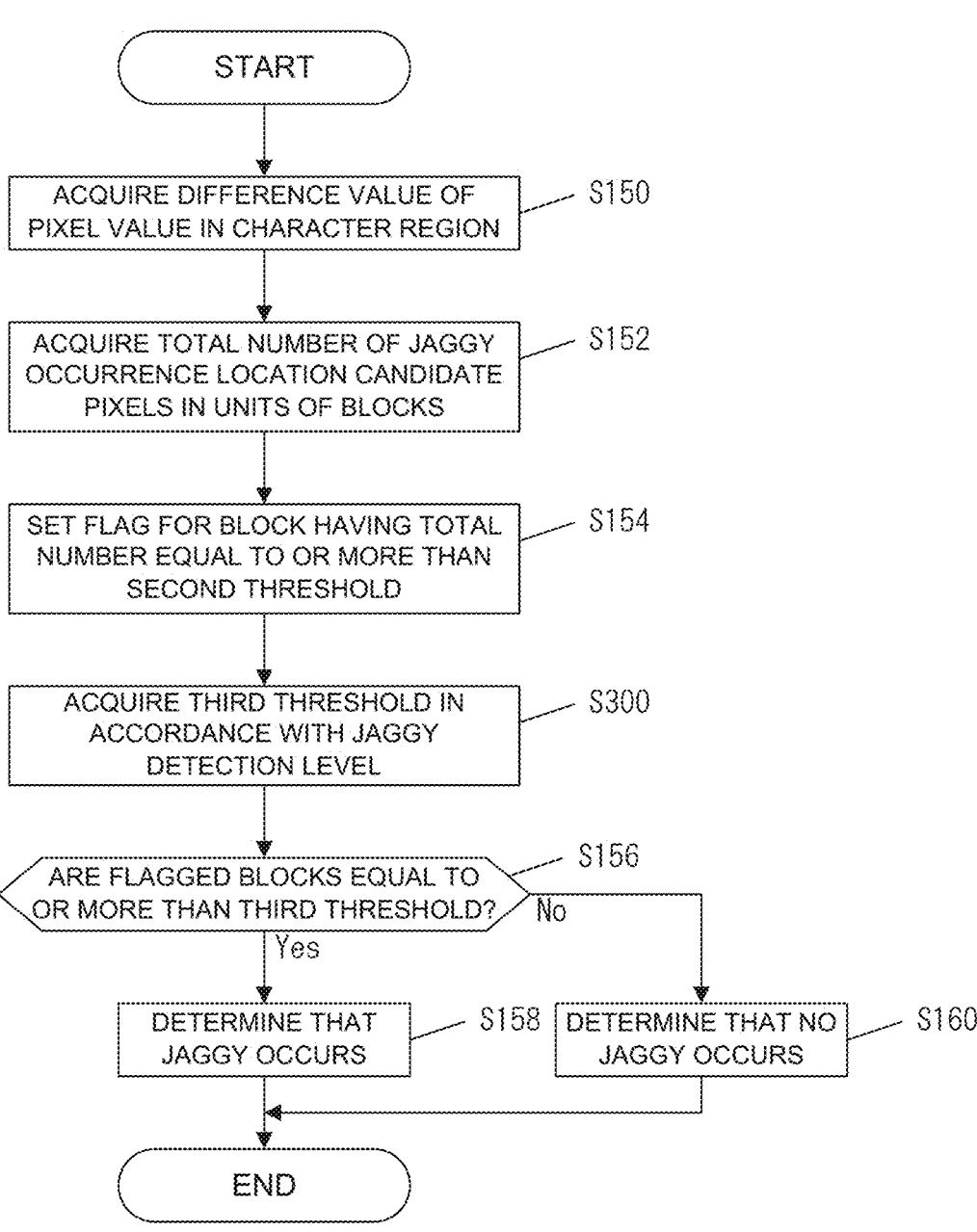
FIG. 15 is a flowchart of a jaggy occurrence/non-occurrence determination process according to the third embodiment.

FIG. 15 is a flowchart illustrating the flow of a gradation conversion process according to the present embodiment. After performing the process in Step S154, the jaggy occurrence determiner 106 acquires the third threshold in accordance with the jaggy detection level (Step S154→Step S300). The jaggy occurrence determiner 106 uses the third threshold acquired in Step S300 to determine whether the number of flagged blocks is equal to or more than the third threshold (Step S156).

In this way, the jaggy occurrence determiner 106 may determine whether a jaggy occurs in accordance with the jaggy detection level.

3.3 Operation Example

Figure 16:
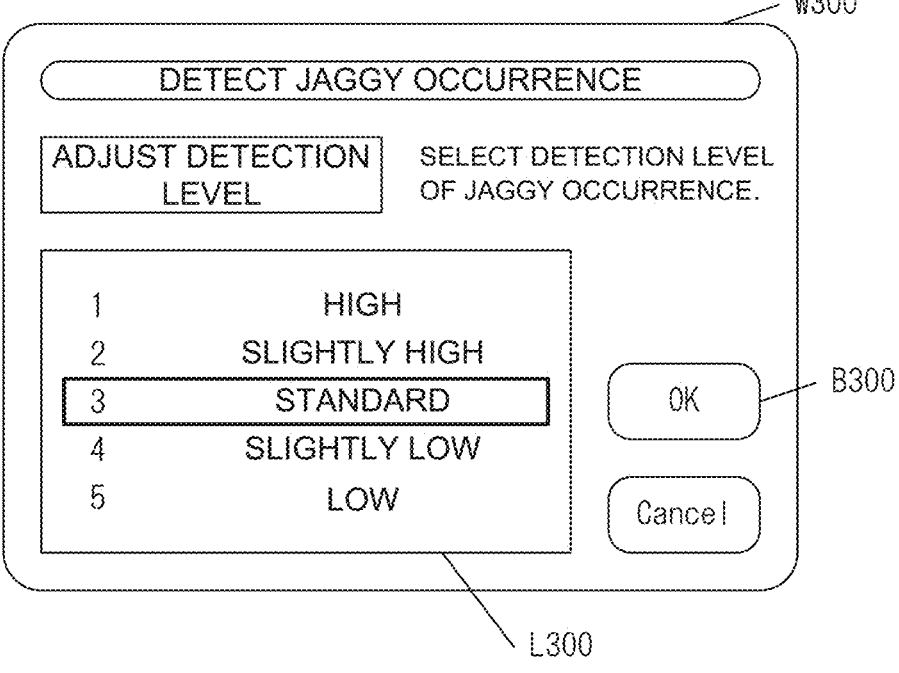
FIG. 16 is a diagram illustrating an operation example according to the third embodiment.

FIG. 16 is a diagram illustrating a screen example of a setting screen according to the present embodiment. A setting screen W300 illustrated in FIG. 16 is a screen for adjusting (setting) the jaggy detection level during the process of detecting the occurrence of a jaggy. The user may select the jaggy detection level from a list L300 for selecting the jaggy detection level and select an OK button B300 via the operation acceptor 150 so as to set the jaggy detection level. Thus, the user may cause the multifunction peripheral 10 to determine the detection of the occurrence of a jaggy in accordance with the set jaggy detection level.

In the description above, the different third threshold is set in accordance with the jaggy detection level, but the different first threshold or second threshold may be set in accordance with the jaggy detection level. In this case, the higher the jaggy detection level, the smaller the threshold may be set, and the lower the jaggy detection level, the larger the threshold may be set.

Thus, with the multifunction peripheral according to the present embodiment, it is possible to detect the occurrence of a jaggy in accordance with the jaggy occurrence detection level. This allows the user to adjust the determination as to whether a jaggy occurs as appropriate.

4. Fourth Embodiment

Next, a fourth embodiment will be described. According to the fourth embodiment, it is possible to switch between using the gradation conversion method designated by the user or the automatically determined gradation conversion method as the gradation conversion method during the gradation conversion process according to the first embodiment. According to the present embodiment, FIG. 3 in the first embodiment is replaced with FIG. 17, and FIG. 7 in the first embodiment is replaced with FIG. 18. The identical process is denoted by the identical reference sign, and its description is omitted.

4.1 Functional Configuration

FIG. 17 is a table illustrating an example of the setting table 170 according to the present embodiment. According to the present embodiment, the setting table 170 stores, as the method for determining the gradation conversion method (gradation conversion method determination method), any one of "user designated" using the gradation conversion method designated by the user or "automatic selection" using the automatically determined gradation conversion method (D400 in FIG. 17). The setting table 170 stores the gradation conversion method designated by the user (D402 in FIG. 17).

The gradation conversion method determination method and the gradation conversion method designated by the user are previously set by the user. For example, the controller 100 displays a setting screen on the display 140 in response to a user operation and enables the setting of the gradation conversion method determination method and the gradation conversion method via the setting screen.

4.2 Process Flow

FIG. 18 is a flowchart illustrating the flow of a gradation conversion process according to the present embodiment. When the occurrence of a jaggy is detected, the gradation conversion method determiner 108 determines whether the gradation conversion method determination method is "user designated" (Step S180→Step S400).

When the gradation conversion method determination method is "user designated", the image processor 102 converts the input image by using the gradation conversion method designated by the user (Step S400; Yes→Step S402). Conversely, when the gradation conversion method determination method is not "user designated", i.e., "automatic selection" (Step S400; No), the gradation conversion method determiner 108 and the image processor 102 execute the process from Steps S182 to S192.

4.3 Operation Example

Figure 19:
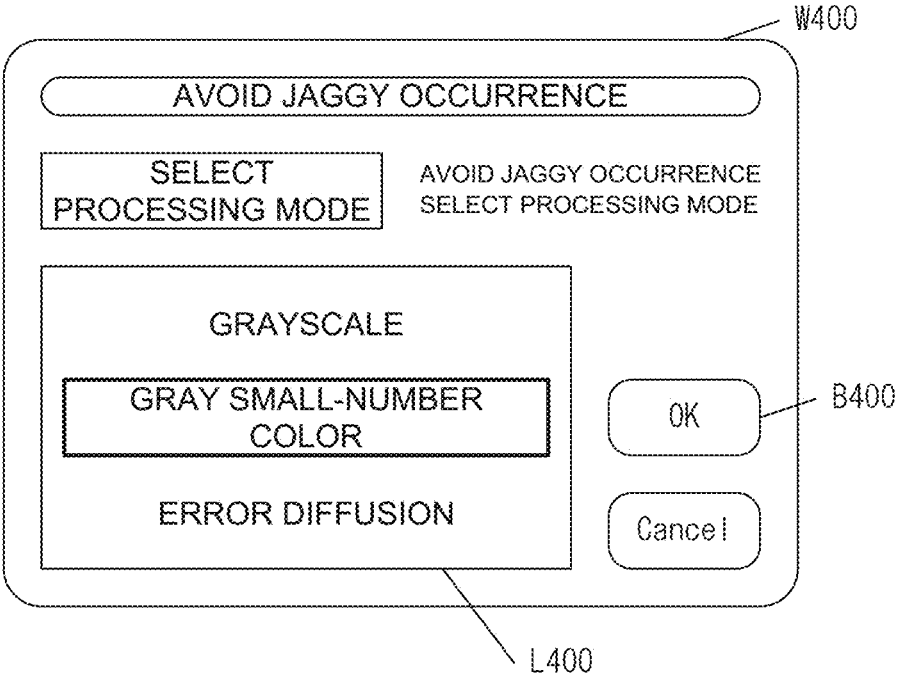
FIG. 19 is a diagram illustrating an operation example according to the fourth embodiment.

FIG. 19 is a diagram illustrating a screen example of a setting screen according to the present embodiment. A setting screen W400 illustrated in FIG. 19 is a screen for designating the gradation conversion method (processing mode) to avoid the occurrence of a jaggy after it is determined that a jaggy occurs. The user may select the gradation conversion method from a list L400 for selecting the gradation conversion method via the operation acceptor 150 and select an OK button B400 to designate the gradation conversion method. This allows the user to designate the gradation conversion method to be used during the gradation conversion process for the input image when the occurrence of a jaggy is detected.

Other than the setting screen W400 illustrated in FIG. 19, a screen may be displayed to select either "user designated" or "automatic selection" as the gradation conversion method determination method so that the gradation conversion method determination method may be selected by the user.

Thus, the multifunction peripheral according to the present embodiment may use the gradation conversion method designated by the user to convert the input image. This allows the user to designate the gradation conversion method for the input image in advance in order to obtain the desired output image in a case where a jaggy occurs when the simple binarization process is performed on the input image.

5. Modification

The present disclosure is not limited to the above-described embodiments, and various modifications may be made. That is, the technical scope of the present disclosure also includes an embodiment obtained by combining technical measures modified as appropriate without departing from the spirit of the present disclosure. In the case described according to the embodiments above, the multifunction peripheral determines whether a jaggy occurs and performs the process to convert the input image using the gradation conversion method, but the process may be provided as a service on the Internet (cloud). It may also be executed as an application executed by a smartphone, or the like. This achieves the function to convert the input image into an appropriate output image and output the image by devices other than image processing apparatuses such as multifunction peripherals.

For convenience of descriptions, the above embodiments are sometimes described separately, while it is obvious that a combination may be made within a technically possible range. For example, the third embodiment and the fourth embodiment may be combined. This allows the user to change the jaggy detection level and select the gradation conversion method used during the gradation conversion process to be executed when the occurrence of a jaggy is detected.

The program operated in each device according to the embodiment is a program that controls the CPU or the like (a program that causes a computer to function) so that the function according to the above embodiment is performed. The information that is handled in the devices is temporarily accumulated in a temporary storage device (e.g., a RAM) during processing, then stored in various storage devices such as a read-only memory (ROM) and an HDD, and read, corrected and written by the CPU as appropriate.

Here, the recording medium that stores the program may be, for example, any of a semiconductor medium (e.g., a ROM or a non-volatile memory card), an optical recording medium/magneto-optical recording medium (e.g., Digital Versatile Disc (DVD)), a Magneto Optical Disc (MO), a Mini Disc (MD), a Compact Disc (CD), and a Blu-ray (registered trademark) disc (BD)), and a magnetic recording medium (e.g., a magnetic tape and a flexible disk). Furthermore, the functions according to the above embodiments are implemented through execution of the loaded program, and also the functions according to the present disclosure may be implemented through processing performed in cooperation with, for example, an operating system or other application programs on the basis of instructions of the program.

For market distribution, the program may be stored and distributed in a portable recording medium or transferred to a server computer connected via a network such as the Internet. In this case, a storage device of the server computer is obviously included in the present disclosure.

Each functional block or various features of the device used according to the embodiments described above may be implemented or executed in an electrical circuit, e.g., an integrated circuit or a plurality of integrated circuits. The electrical circuit designed to perform the functions described herein may include general-purpose processors, digital signal processors (DSP), application-specific integrated circuits (ASIC), field programmable gate arrays (FPGA), or other programmable logic devices, discrete gate or transistor logic, discrete hardware components, or a combination of these. A general-purpose processor may be a microprocessor or a conventional processor, controller, microcontroller, or state machine. The electrical circuit described above may include a digital circuit or an analog circuit. When an integrated circuit technology that replaces the current integrated circuits emerges as a result of advances in semiconductor technology, one or more aspects of the present disclosure may also use new integrated circuits based on such technology.

What is claimed is:

1. An image processing apparatus comprising an image inputter and a controller, wherein
   the controller
      acquires a multiple-value image having a plurality of gradation values via the image inputter,
      acquires a first image by performing a correction process and a simple binarization process on the multiple-value image and a second image by performing the correction process on the multiple-value image,
      uses a difference value of a pixel value of the second image with respect to the first image on a pixel-by-pixel basis to determine whether a jaggy occurs when the multiple-value image is output as a simple binary image,
      when the jaggy occurs, determines a conversion method for converting the multiple-value image in accordance with a statistical amount calculated using an entropy value of the difference value, and
      outputs an image obtained by conversion using the determined conversion method,
   wherein the conversion method comprises one of a first conversion method for converting the multiple-value image to grayscale, a second conversion method for performing an error diffusion process on the multiple-value image to convert the multiple-value image into a binary image, and a third conversion method for converting the multiple-value image in gray small-number colors.

2. The image processing apparatus according to claim 1, wherein the controller determines the conversion method for converting the multiple-value image based on a range of the entropy value of the difference value.

3. The image processing apparatus according to claim 2, wherein
   the multiple-value image is selectively output with priority on file size or image quality,
   when the multiple-value image is output with priority on the image quality, the controller determines that a priority order for determining the conversion method for converting the multiple-value image is the following order; the first conversion method, the second conversion method, and then the third conversion method, and
   when the multiple-value image is output with priority on the file size, the controller determines that the priority order for determining the conversion method for converting the multiple-value image is the following order; the third conversion method, the second conversion method, and then the first conversion method.

4. The image processing apparatus according to claim 1, wherein the correction process includes at least a process to correct contrast of the multiple-value image.

5. The image processing apparatus according to claim 4, wherein the first image is obtained by performing
   as the correction process, a sharpening process on the multiple-value image and then a process to correct contrast of the multiple-value image, and
   a simple binarization process after the correction process.

6. The image processing apparatus according to claim 1, wherein the controller detects occurrence of the jaggy by using only pixels included in a character region of the multiple-value image.

7. The image processing apparatus according to claim 6, wherein the controller determines that the jaggy occurs when a number of blocks is equal to or more than a third threshold, in which a number of candidate pixels, which are pixels having the difference values equal to or more than a first threshold, in units of blocks of the multiple-value image is equal to or more than a second threshold.

8. An image processing method comprising:

acquiring a first image by performing a correction process and a simple binarization process on a multiple-value image having a plurality of gradation values and a second image by performing the correction process on the multiple-value image and using a difference value of a pixel value of the second image with respect to the first image on a pixel-by-pixel basis to determine whether a jaggy occurs when the multiple-value image is output as a simple binary image, when the jaggy occurs, determining a conversion method for converting the multiple-value image in accordance with a statistical amount calculated using an entropy value of the difference value, and outputting an image obtained by conversion using the determined conversion method, wherein the conversion method comprises one of a first conversion method for converting the multiple-value image to grayscale, a second conversion method for performing an error diffusion process on the multiple-value image to convert the multiple-value image into a binary image, and a third conversion method for converting the multiple-value image in gray small-number colors.

9. The image processing method according to claim 8, further comprising determining the conversion method for converting the multiple-value image based on a range of the entropy value of the difference value.

10. The image processing method according to claim 9, further comprising:

selectively outputting the multiple-value image with priority on file size or image quality, when the multiple-value image is output with priority on the image quality, determining that a priority order for determining the conversion method for converting the multiple-value image is the following order; the first conversion method, the second conversion method, and then the third conversion method, and when the multiple-value image is output with priority on the file size, determining that the priority order for determining the conversion method for converting the multiple-value image is the following order; the third conversion method, the second conversion method, and then the first conversion method.

11. The image processing method according to claim 8, wherein the correction process includes at least a process to correct contrast of the multiple-value image.

12. The image processing method according to claim 11, wherein the first image is obtained by performing as the correction process, a sharpening process on the multiple-value image and then a process to correct contrast of the multiple-value image, and a simple binarization process after the correction process.

13. The image processing method according to claim 8, further comprising detecting occurrence of the jaggy by using only pixels included in a character region of the multiple-value image.

14. The image processing method according to claim 13, further comprising determining that the jaggy occurs when a number of blocks is equal to or more than a third threshold, in which a number of candidate pixels, which are pixels having the difference values equal to or more than a first threshold, in units of blocks of the multiple-value image is equal to or more than a second threshold.

* * * * *